United States Patent
Nagashima

(10) Patent No.: US 6,438,574 B1
(45) Date of Patent: Aug. 20, 2002

(54) MULTIFUNCTIONAL APPARATUS AND DATA PROCESSING METHOD

(75) Inventor: Nao Nagashima, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/192,296

(22) Filed: Nov. 17, 1998

(30) Foreign Application Priority Data

Nov. 18, 1997 (JP) ............................................. 9-332280

(51) Int. Cl.[7] ................................................ G06F 9/00
(52) U.S. Cl. ........................ 709/102; 709/100; 709/101; 709/103; 709/104; 709/105; 709/107; 709/238; 709/232
(58) Field of Search .............................. 709/1, 100–107, 709/232, 238

(56) References Cited

U.S. PATENT DOCUMENTS

| | | | | |
|---|---|---|---|---|
| 4,617,596 A | * | 10/1986 | Yoshida et al. ............. 358/452 |
| 4,811,109 A | * | 3/1989 | Shimizu et al. ............. 358/453 |
| 5,358,238 A | * | 10/1994 | Mandel et al. .............. 271/298 |
| 5,396,345 A | * | 3/1995 | Motoyama .................. 358/448 |
| 5,444,517 A | * | 8/1995 | Nagashima ................. 399/366 |
| 5,444,846 A | * | 8/1995 | Nagashima ................. 345/504 |
| 5,579,087 A | * | 11/1996 | Salgado ..................... 399/1 |
| 5,835,577 A | * | 11/1998 | Disanto et al. ............ 379/93.19 |
| 5,872,569 A | * | 2/1999 | Salgado et al. ............ 345/349 |

FOREIGN PATENT DOCUMENTS

WO     95/30958     * 11/1995

* cited by examiner

Primary Examiner—Zarni Maung
Assistant Examiner—Nabil El-Hady
(74) Attorney, Agent, or Firm—Fitzpatrick, Cella, Harper & Scinto

(57) ABSTRACT

In a multifunctional apparatus used by a plurality of users, image data entered in a variety of formats from various information sources such as a scanner, computer, facsimile machine and electronic mail is stored on a memory medium such as a hard disk in correspondence with user IDs. By operating the multifunctional apparatus storing this image data to enter a user ID, a list of image data stored in correspondence with the user ID is displayed together with information relating to the image data. Desired image data is selected from the list and is subjected to processing such as printing or deletion. Image data for which a password has been set can be processed by entering the correct password. By virtue of the processing described, handling of the entered image data is facilitated and protection of confidentiality is made possible.

19 Claims, 21 Drawing Sheets

FIG. 5

| USER NAME | ID CODE | PASSWORD | FAX ADDRESS | MAIL ADDRESS |
|---|---|---|---|---|
| AAAA | ID-AA | PWAA | 300-0001 | AAAA@companyx.com |
| BBBB | ID-BB | PWBB | 300-0002 | BBBB@companyx.com |
| CCCC | ID-CC | PWCC | 300-0003 | CCCC@companyx.com |
| DDDD | ID-DD | PWDD | 300-0004 | DDDD@companyx.com |

MULTIFUNCTIONAL APPARATUS AND DATA PROCESSING METHOD

BACKGROUND OF THE INVENTION (a) Field of the Invention

This invention relates to a multifunctional apparatus and data processing method for processing entered data by a variety of methods.

(b) Related Art

The application of digital techniques to copiers has not only made it possible to use a copier for simple copying purposes but has also led to the rapid development of multifunctional apparatuses equipped with a printer function for printing output data from personal computers, a scanner function for supplying a personal computer with an image that has been read, and a facsimile transmission/reception function.

A multifunctional apparatus of this type has a network interface for interfacing a network and thus makes it possible for the multifunctional machine to be shared by a plurality of users via computers connected to the network. By thus allowing a multifunctional machine having various functions to be shared by a plurality of users, it is possible to reduce the floor area occupied by equipment in an office and to use the equipment with greater efficiency.

In a conventional multifunctional machine, however, the copier function, printer function and scanner or facsimile function are merely combined and the machine is not necessarily easy for the user to use.

For example, in a situation where a plurality of users direct printing operations simultaneously, the printouts of the jobs printed are stacked in the paper drop tray. When the user goes to the machine to pick up his or her own printout at the end of a printing operation, therefore, the user must take the trouble to find his or her printout.

Further, in a case where a user directs a printing operation and causes a job to be printed but leaves the printout in the drop tray for a long period of time or forgets to pick up the printout, the drop tray becomes full of printing paper constituting printouts and it takes considerable time for the user to find his or her own printout. There are also occasions where the user cannot find his or her own printout because another person has mistakenly taken it away. These difficulties can lead to serious problems when information requiring confidentiality is printed out or output by facsimile transmission.

One attempt to eliminate these difficulties is to shift the paper drop tray job by job to make it easy to distinguish the division of one job from another. Another is to allocate each bin of a sorter to an individual job. However, these attempts do not provide a comprehensive solution because the paper drop trays and the bins of the sorter become full quickly when a large number of users share the copier. In particular, when document information or the like is not confidential, the copier executes printing operations one after another. As a consequence, a plurality of jobs become mixed in the drop tray and, as a result, it is difficult for a user to find his or her own job quickly.

In recent years hard disk drives and semiconductor memory devices have been provided with greater capacity and lowered in price. This has been accompanied by lower cost per unit of storage capacity. Some copiers employ a method in which a document image or output information that is described in Page Description Language (referred to as "PDL" below) is converted to image data, the image data is compressed and stored temporarily on a hard disk drive (HDD) or dynamic memory (DRAM), etc., and the image data is output in one batch, while being decompressed, when image data equivalent to a plurality of pages or plurality of copies has been stored.

In a copier of this type, the time needed to develop output information, which is described in PDL, into a visible image differs greatly depending upon the content of the data. As a result, various functions such as a copier function, facsimile function, printer function and scanner function can be executed simultaneously in apparent terms and it is possible to utilize the printer and scanner functions efficiently. More specifically, when image data of a plurality of pages or plurality of copies has been stored in the above-mentioned copier, the image data is output in one batch while being decompressed. This makes it possible to achieve parallel operation in which local copying utilizing a scanner and printer is carried out even while PDL data is being received from a personal computer. The data received from the personal computer can be printed following the end of local copying.

In a case where a multifunctional machine is used exclusively by a specific user, it is possible to use the machine as a printer or scanner efficiently by the above-described method of storing received data temporarily. However, in a case where a plurality of users share one multifunctional machine, merely storing received data temporarily and then outputting the data in response to the end of another job does assure that the machine will always function effectively. Thus there is demand for the construction of an information processing system that is easy to use.

SUMMARY OF THE INVENTION

Accordingly, an object of the present invention is to provide a multifunctional apparatus and a data processing method devoid of the aforementioned difficulties.

Another object of the present invention is to provide a multifunctional apparatus and a data processing method through which data can be output and distinguished on a per-user basis.

Another object of the present invention is to provide a multifunctional apparatus and a data processing method in which a plurality of items of data relating to different jobs can be handled in one batch.

A further object of the present invention is to provide a multifunctional apparatus and a data processing method that make it possible to protect the confidentiality of data that is to be output.

Yet object of the present invention is to provide a multifunctional apparatus and a data processing method that make it possible to prevent the mixing of hard copy outputs of entered data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a table showing an example of stored information stored on an ID card to be used in this embodiment;

DESCRIPTION OF THE PREFERRED EMBODIMENTS

Embodiments of the present invention will now be described in detail with reference to the drawings.

Figure 1:
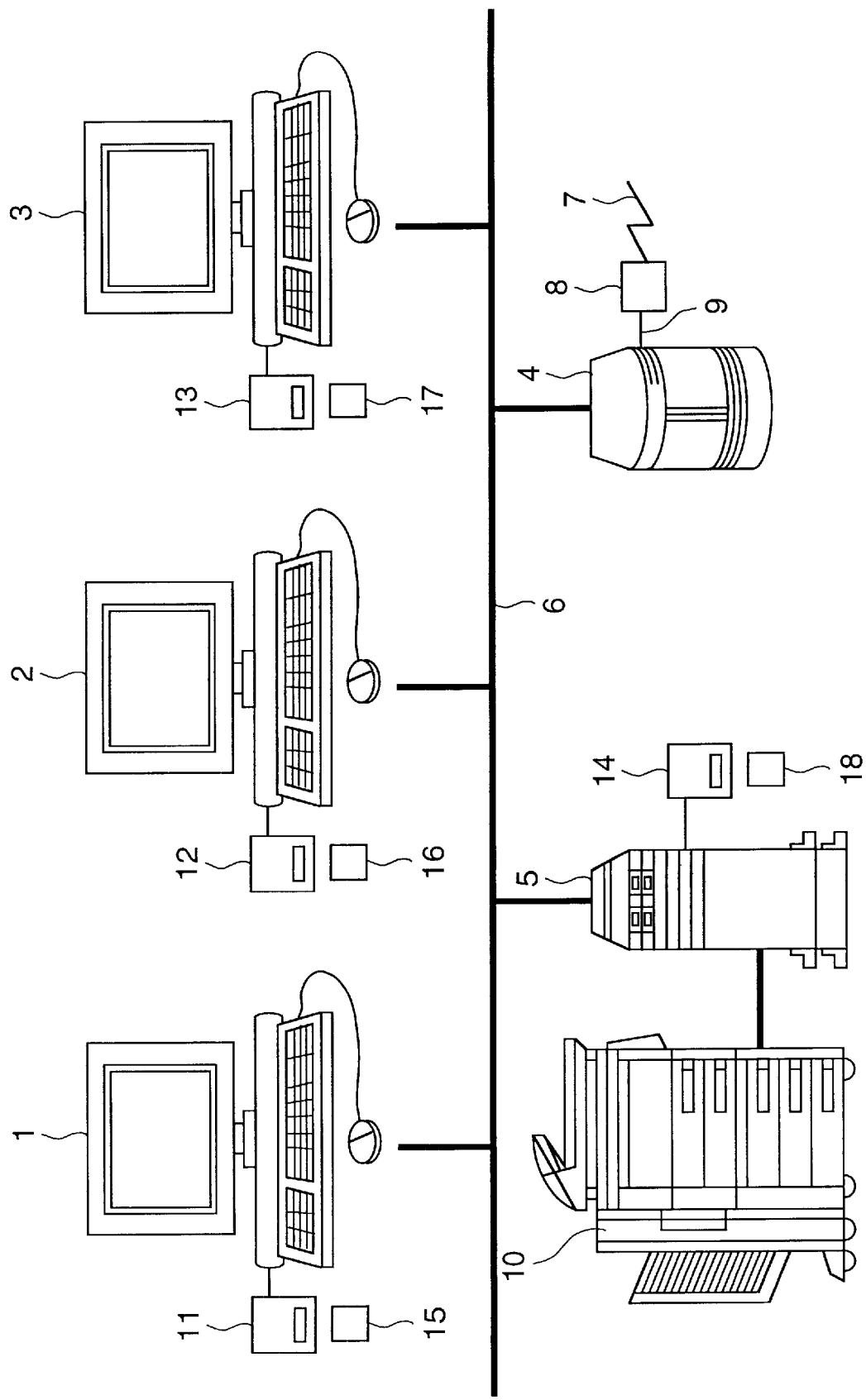
FIG. 1 is a diagram showing the configuration of an information processing system according to an embodiment of the present invention.

FIG. 1 is a diagram showing the configuration of an information processing system according to an embodiment of the present invention. The information processing system includes a plurality of computers (first through third computers) 1–3, a first server 4 for managing facsimile communication and the sending/receiving of electronic mail (referred to as "e-mail" below), a controller 5 and a network 6 such as a LAN connecting these system components. A first connection unit 8, which is connected to a communication line 7 such as an ISDN or other digital line or an analog public line such as a PSTN, is connected to the first server 4 via a first connecting line 9, and a digital copier 10 is connected to the controller 5.

First through fourth ID card recognition units 11–14 are connected to the first through third computers 1–3 and controller 5, respectively. ID cards 15–18 are capable of being removably inserted into the first through fourth ID card recognition units 11–14, respectively, so that the content stored on the ID cards 15–18 can be read by the first through fourth ID card recognition units 11–14.

Figure 2:
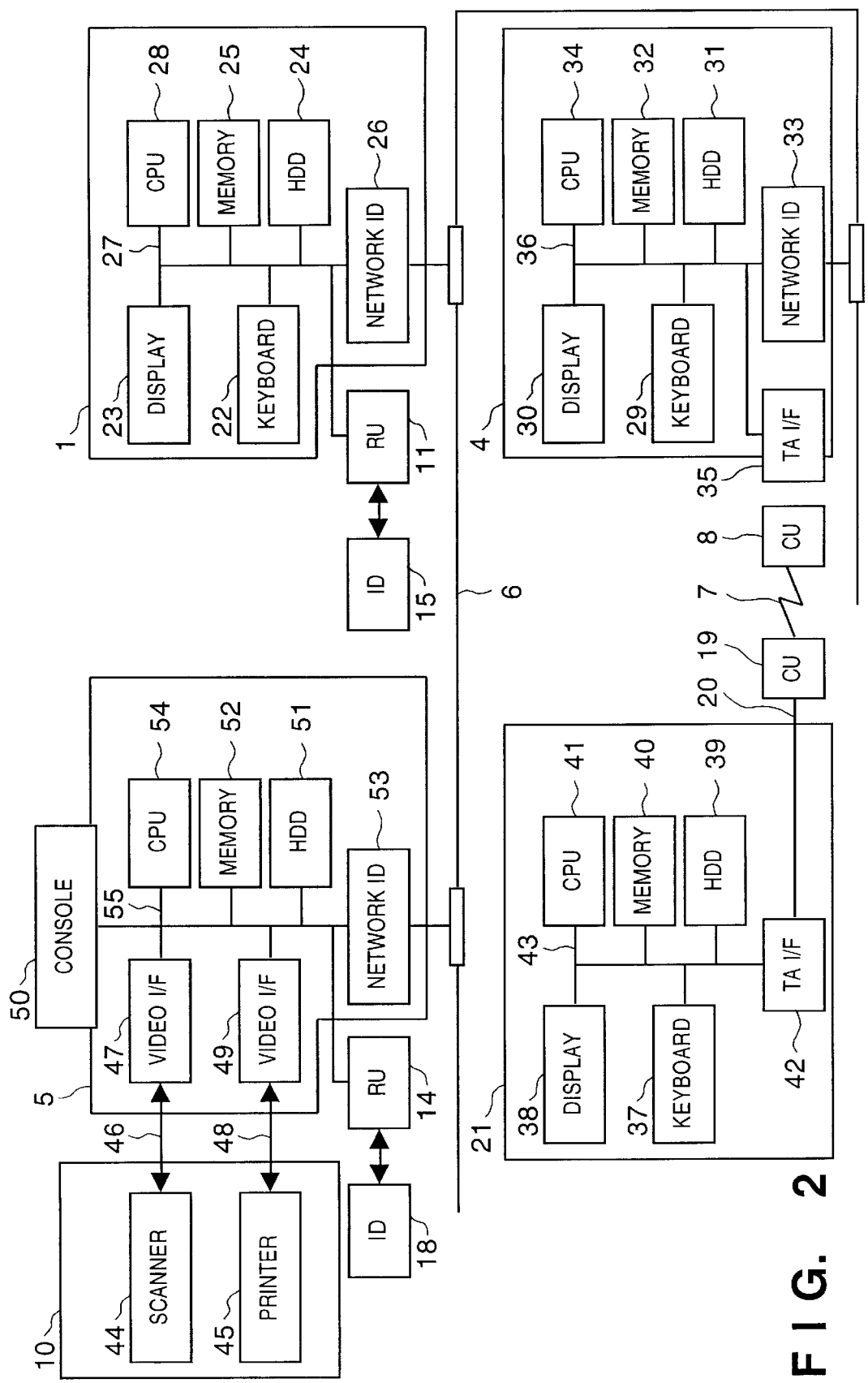
FIG. 2 is a block diagram showing the details of the system configuration of FIG. 1.

FIG. 2 is a block diagram showing the details of the system configuration of FIG. 1. The first through third computers 1–3 are constructed identically and only the first computer 1 is shown in FIG. 2 for the sake of simplicity. The first connection unit 8 is connected to a second connection unit 19 via the communication line 7, and the second connection unit 19 is connected to a second server 21 via a second connecting line 20.

The first computer 1 includes a keyboard 22 for entering prescribed data, a display 23 for displaying input information, a hard disk drive (HDD) 24 storing a prescribed processing program, a memory 25 for temporarily storing the results of processing, a network ID storage unit 26 storing the ID of the network 6, and a CPU 28, which is connected to the above-mentioned components and to the first ID card recognition unit 11 via an internal bus 27, for supervising overall control of the apparatus.

When the ID card 15 is inserted into the first ID card recognition unit 11 of first computer 1 constructed as set forth above, stored information that has been written to the ID card 15 is recognized by the first ID card recognition unit 11, after which a desired operation can be started by entering data via the keyboard 22.

The first server 4 has a keyboard 29, display 30, hard disk drive 31, memory 32, network ID storage unit 33 and CPU 34, which operate in a manner similar to the corresponding components of the first computer 1, and a terminal adapter (TA) 35, these components being connected via an internal bus 36. Like the first server 4, the second server 21 also includes a keyboard 37, display 38, hard disk drive 39, memory 40, CPU 41 and terminal adapter (TA) 42 connected via an internal bus 43. Though the arrangement is not shown, the second server 21 is connected to a network different from the network 6 and manages data relating to facsimile communication and to the sending/receiving of e-mail. This data is sent and received via this other network. In a case where data is sent and received between the first server 4 and second server 21, data exchange is performed automatically via the first and second connection units 8, 19 and communication line 7.

The digital copier 10 has a scanner unit 44 for reading image data, and a printer unit 45 for printing image data and the like read by the scanner 44.

The controller 5 includes a scanner video interface (I/F) 47, which is connected to the scanner 44 via a scanner video cable 46, for interfacing the scanner 44, a printer video interface (I/F) 49, which is connected to the printer 45 via a printer video cable 48, for interfacing the printer 45, a console 50 for specifying number of prints, copy density and the like when the digital copier 10 is caused to print an image, a hard disk drive 51, a memory 52, a network ID storage unit 53 and a CPU 54. These components and the fourth ID card recognition unit 14 are connected via an internal bus 55.

When PDL data sent from the first computer 1 is received by the controller 5 constructed as set forth above, the CPU 54 generates a raster image data capable of being accepted by the printer 45 of digital copier 10 or applies processing such as image compression processing to image data, which has been read by the scanner 44 of digital copier 10, stores the processed data in the memory 52, and execute facsimile transmission or the like based upon a command from the first computer 1. In the following description, CPU 54, together with the memory 52 and the hard disk drive 51, operates as a software RIP (raster image processor) which generates a raster image data from PDL by executing a software.

Figure 3:
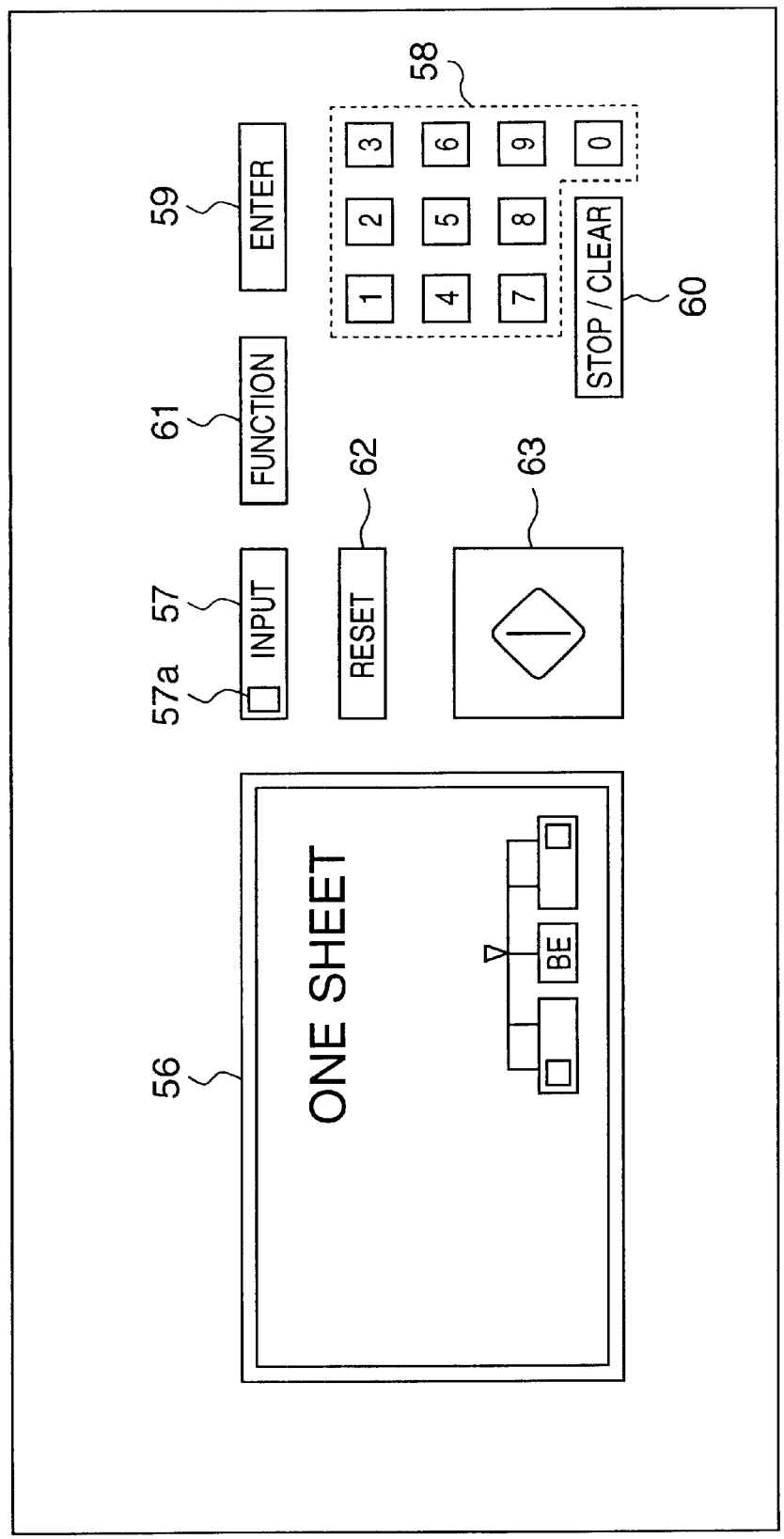
FIG. 3 is a plan view showing the control console of a computer illustrated in FIG. 2.

FIG. 3 is a plan view showing the console 50 illustrated in FIG. 2.

A touch-sensitive control panel (touch panel) 56, which comprises a combination of a liquid crystal panel and a touch-sensitive panel placed thereon, is capable of displaying number of copies and number of prints and can be used to specify copy density and the like. The touch panel 56, which has a hierarchical structure through which the state of the display and its operation can be altered by software, can be used to set the printer or scanner by way of a dialog format. An ID input key 57 has an indicator 57a. When the ID card 18 is inserted and the stored information on the ID card 18 has been recognized by the fourth ID card recognition unit 14, the indicator 57a lights. When an error, e.g. reading error occurs, the indicator 57a is blinked or the color thereof changes to inform the user of an abnormality. If the desired ID card does not exist, pressing the ID input key 57 makes it possible to operate a numeric key pad 58 and enter key 59 so that the desired ID code or the like can be entered manually. More specifically, keys of the numeric key pad 58 are pressed to enter a numerical value such as an ID code or number of copies, and the enter key 59 is pressed to finalize the input information such as the ID code or the input of a magnification ratio at the time of copying operation.

A stop/clear key 60 is for stopping a copying operation or scanning operation, etc., in mid-course or for clearing a number when an entry of a numerical value is made. A function key 61 causes functions are used infrequently to be displayed on the touch panel 56. Pressing the function key 61 causes a desired function to be displayed on the touch panel 56, thereby making it possible to perform a desired operation using the touch panel 56. A reset key 62 returns the settings of the digital copier 10 to default settings. A copy key 63 designates the start of a copying operation or the start of scanning.

Figure 4:
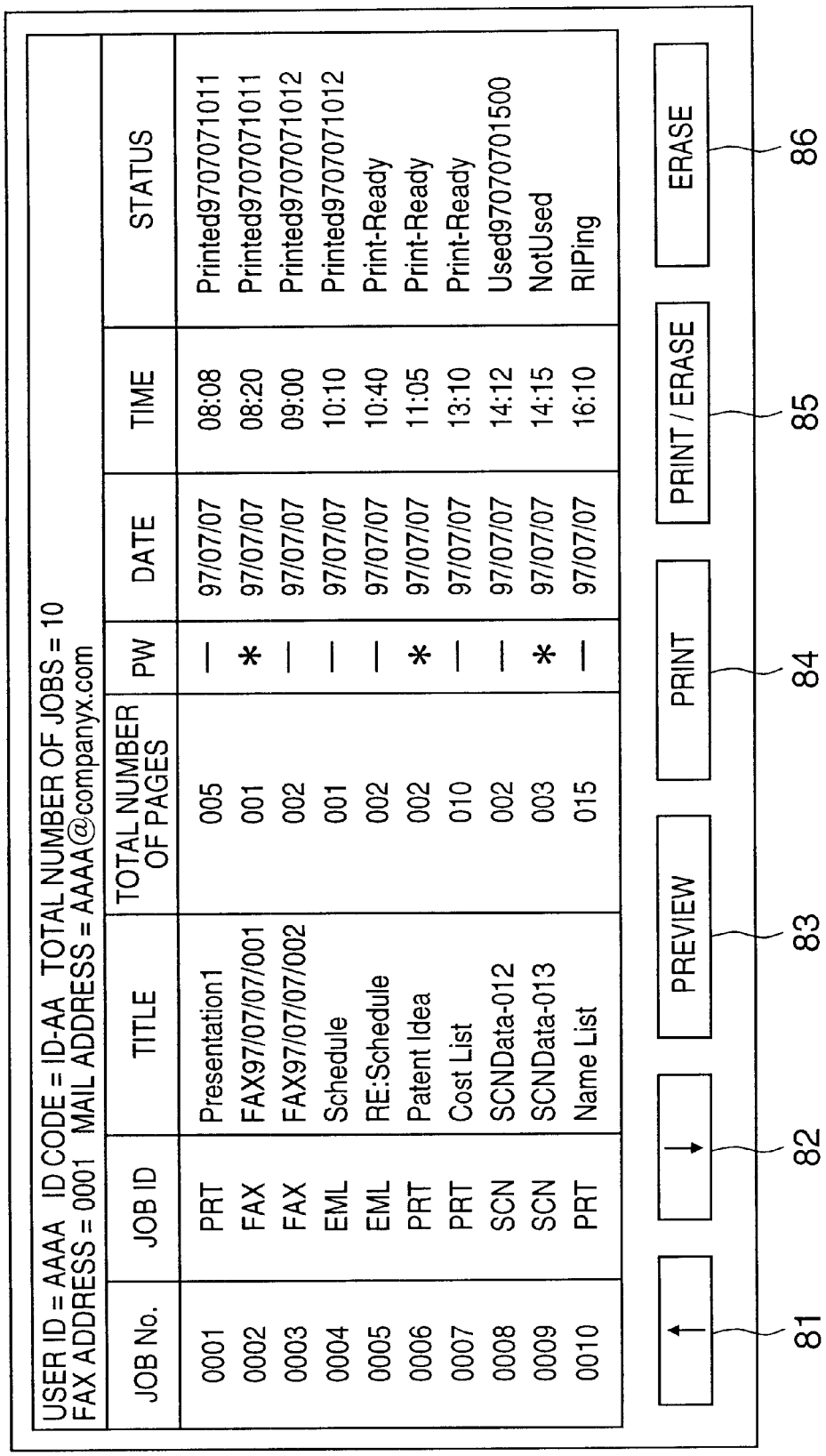
FIG. 4 is a diagram showing an example of a display presented on a touch-sensitive control panel of the control console.

FIG. 4 illustrates an example of data items displayed on the touch panel 56. The items are displayed as a list corresponding to the user ID of the ID card 18 when this ID card has been inserted into the ID card recognition unit 14. The data comprise the list are included in the data that has been stored in the hard disk drive 51.

In this embodiment, user ID, ID code, FAX address, mail address and total number of jobs, which are stored on the ID card, are displayed at the top of the touch panel 56.

Various display columns are provided below the items mentioned above. Specifically, the display columns include a job number column, a job ID column, a title column, a column for total number of pages, a column indicating whether a password (PW) is required or not, a date column, a time column and a status column. These columns display job numbers; job types [FAX, PRT (printing), SCN (image scanning), EML (e-mail)]; titles; total numbers of pages in a case where object data associated with the jobs is printed; whether or not a password is required (where * indicates a job requiring entry of a password); dates and times at which jobs were accepted; and status of object data associated with the jobs. The object data associated with the jobs indicates the substance of data processed in each job.

Cursor keys 81, 82 are used when a job to be selected is changed and when the screen is to be scrolled. A preview key 83 is used when the content of the object data of a selected job is verified by a thumbnail image (an image of reduced size). Pressing the preview key 83 makes it possible to verify, by a thumbnail image, the content of a job whose content cannot be judged from the job title alone. A print key 84 is used when the object data of a selected job is printed. Using the print key 84 makes it possible to print image data that has been scanned for a facsimile transmission, for example. After printing is performed, the object data can be stored without being erased. A print/erase key 85 is used in a case where the object data of a selected job is erased after being printed. Using the print/erase key 85 makes it possible to automatically erase the object data of a job, which is no longer necessary, after the job is printed. An erase key 86 is used in a case where the object data of a selected job is manually erased after being printed.

In this embodiment, FIG. 4 shows that the object data of Job Nos. 0001–0004 has been printed at the moment the list is displayed. For example, the status "Printed 9707071011" of Job No. 0001 indicates that printing processing was performed at 10:11 on Jul. 7, 1997. The status of Job Nos. 0005–0007 indicates that printing is possible and that printing can be performed immediately by pressing the print key 84 or print/erase key 85. Job No. 0008 indicates that image data for facsimile transmission was scanned at 15:00 on Jul. 7, 1997. Job No. 0009 indicates that image data that was scanned for facsimile transmission has been left unused. Job No. 0010 indicates that processing by an RIP (Raster Image Processor) is in progress.

The ID cards 15–18 are not specific to the first through fourth ID card recognition units 11–14 and are employed to specify users who may use devices such as the first through third computers 1–3, digital copier 10 and first server 4. For example, if users who use the information processing system of FIG. 1 are ten in number, then ten types of ID cards would exist.

As shown in FIG. 5, the ID cards each store a user name, an ID code, a password if required, a FAX address indicating a line number for facsimile communication, and a mail address for e-mail.

More specifically, if there are four users, the names of the individuals are stored as user names, e.g., AAAA, BBBB, CCCC and DDDD, and ID-AA, ID-BB, ID-CC and ID-DD, for example, are stored as the ID codes corresponding to these user names.

In a case where a user (e.g., user name AAAA) is to specify printing by the first computer 1, the user inserts the ID card 15 into the first ID card recognition unit 11, causes the first ID card recognition unit 11 to read the ID code, e.g., ID-AA, and performs an operation to achieve printout. In response, the ID code ID-AA of the ID card 15 is added onto the print data and the print data is then transmitted from the first computer 1 to the controller 5 via the network 6. The user AAAA goes to the location of the controller 5 and inserts the ID card 15 into the fourth ID card recognition unit 14. The fourth ID card recognition unit 14 reads the ID code ID-AA on the ID card 15 and the controller 5 selects the print job relating to the print data onto which the ID code ID-AA has been added, displays the print job on the touch panel 56 of the console 50 and accepts the desired operation, such as a designation of the number of copies, from user AAAA. As a result, the user is always capable of handling his or her own job in simple fashion without confusing the job with that of another person. In addition, the user can prevent another individual from accessing his or her own job. Another individual cannot print the job without permission or come to know the job information. Thus the confidentiality of the job is assured.

The password demonstrates that the user is duly authorized in order to prevent wrongful use of the ID card in the event that the IC card is lost or stolen. For example, PWAA, PWBB, PWCC, PWDD are stored on the ID cards as passwords if necessary. By storing a password on an ID card, even highly confidential documents can be handled without the content thereof being leaked to other individuals. Security is thus assured.

Further, using the ID card makes possible the management of facsimile communication and e-mail.

In a case where facsimile communication is carried out, the ID code of the transmission destination is stored in the header of the transmission data and the ID code corresponding to each user, i.e., the corresponding table, is stored in the first server 4, whereby job management on a per-user basis can be implemented in simple fashion. More specifically, by sending the transmission data to the controller 5 and performing an operation similar to that described above, only transmission data that has been sent to one's own address can be printed out by the digital copier 10. In a case where an ID code has not been attached, facsimile line numbers are allocated on a user-by-user basis. For example, 300-0001, 300-0002, 300-0003, 300-0004 and line numbers are allocated, as shown in FIG. 5, these line numbers are stored in the headers of the communication data, and the first server 4 stores the corresponding tables. This arrangement also makes it possible to simply manage jobs on a per-user basis. Various other methods can also be applied, such making use of subaddresses.

In a case where e-mail is sent and received, job management can be performed in a manner substantially the same as that in a case where facsimile communication is carried out. Specifically, if e-mail has been sent to the mail address AAAA@companyx.com, the first server 4 refers to the corresponding table to thereby ascertain that this e-mail is directed to user AAAA. The transmission data constituting the e-mail is converted to a format in which it can be printed, the ID code ID-AA is attached to the transmission data and the data is then transmitted to the controller 5, and the digital copier 10 can print out only the e-mail directed to its own address. The e-mail is printed out through a method the same as that described above. It is possible to adopt an arrangement in which the e-mail system itself has a function for identifying the user. In this case received data that has been stored in the first server 4 is temporarily read by the first through third computers 1–3, transmission data is discriminated as being data concerning a specific user AAAA, the ID code ID-AA is added onto the received data, this data is then transmitted from the first through third computers 1–3 to the digital copier 10 via the controller 5, and the transmitted data is printed out by the digital copier 10.

Examples of ID cards are an optically controlled card in which ID information is read optically, and an entrance card serving also as an identification card for security purposes.

Figure 6:
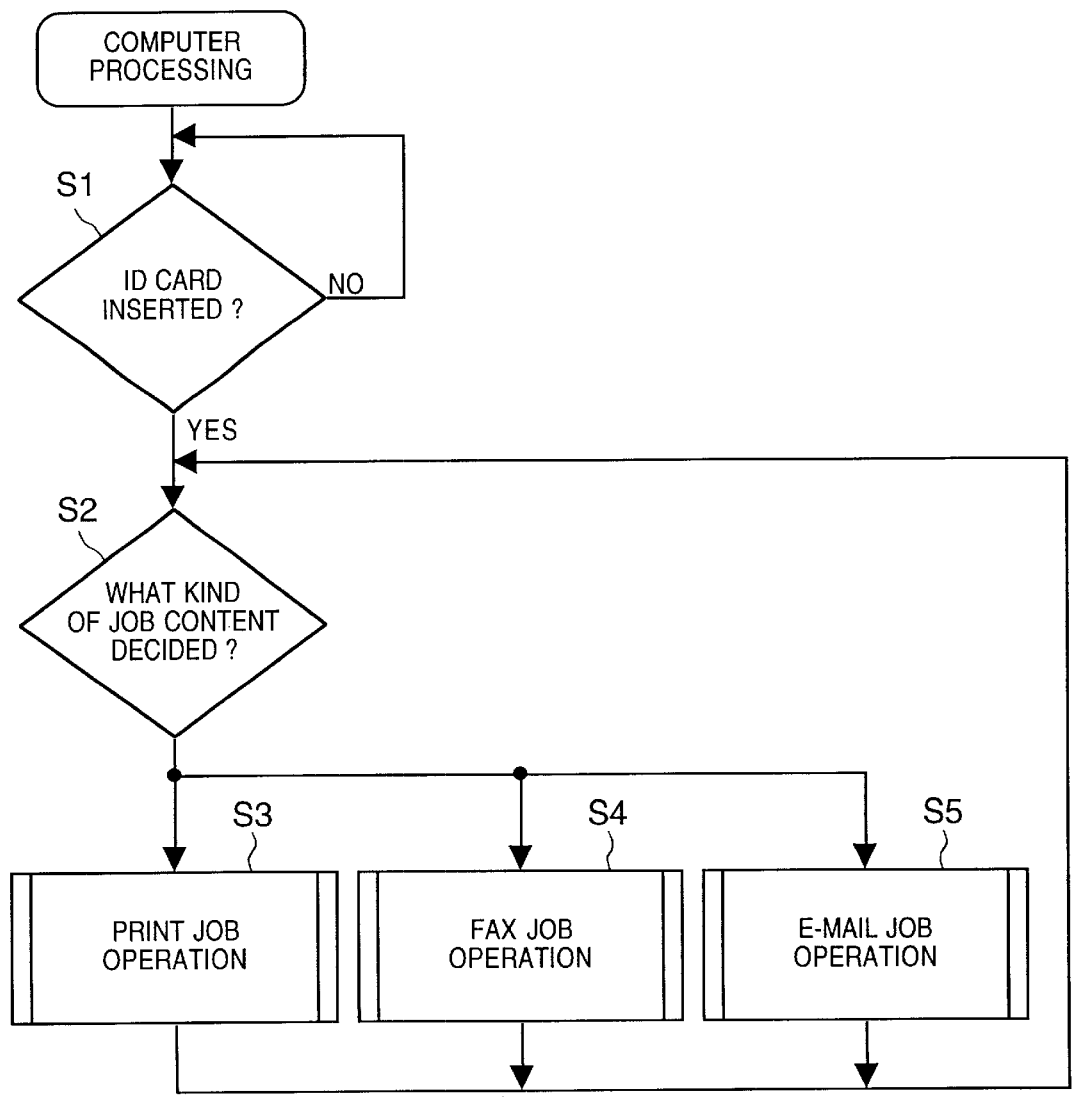
FIG. 6 is a flowchart showing a main control procedure executed by the computer in the information processing system of this embodiment.

FIG. 6 is a flowchart illustrating a control procedure executed by the first through third computers 1–3. For example, FIG. 6 illustrates processing executed by the CPU 28 based upon a program that has been installed in the hard disk drive 24 of the first computer 1. In the description that follows, a case in which the user employs the first computer 1 to perform information processing is set forth. However, it goes without saying that the user may employ the second computer 2 or third computer 3 to perform information processing in the same way.

It is determined at step S1 whether an ID card has been inserted into the first ID card recognition unit 11. If the ID card has been inserted into the first ID card recognition unit 11, the information stored on the ID card is recognized. The keyboard 22 of the first computer 1 is then operated to decide the content of a job (step S2). In case of printing processing, a print job operation is performed (step S3) so that processing for outputting PDL data to the printer 45 of digital copier 10 is executed. In case of facsimile communication, a FAX job operation is performed (step S4) so that facsimile transmission data read by the scanner 44 or reception data stored in the first server 4 is processed. In case of e-mail transmission, an e-mail job operation is performed (step S5) so that e-mail sending/receiving processing is executed. Control returns to step S2 at the end of each processing operation.

Figure 7:
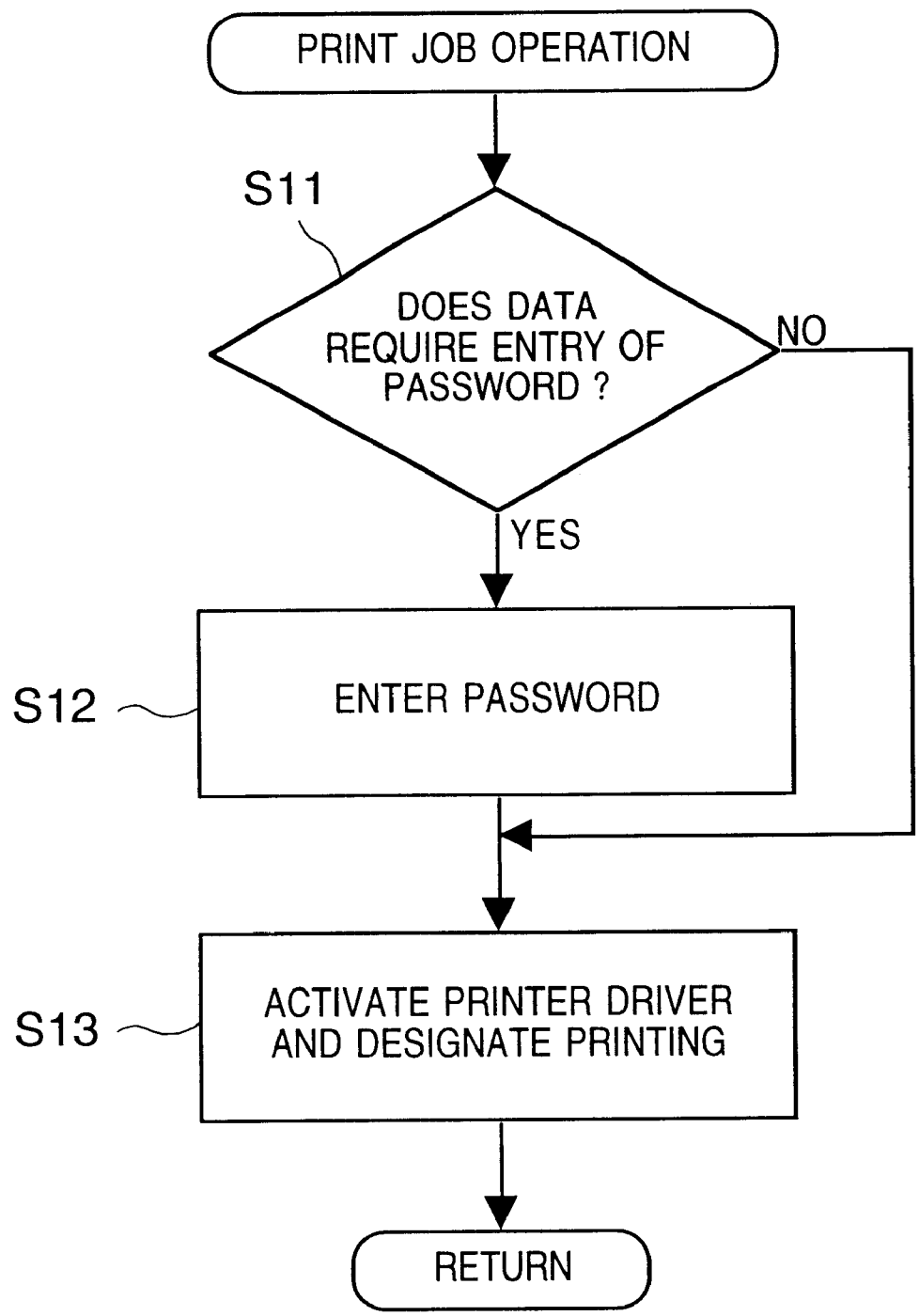
FIG. 7 is a flowchart of a print job operation routine included in the main control procedure.

FIG. 7 is a flowchart of the print job operation routine executed at step S3.

It is determined at step S11 whether it is necessary to attach a password to a job. That is, there are instances where it is necessary to maintain the secrecy of job data printed in a case where a document to the like is created using application software such as a word processor or spreadsheet. If such secrecy is unnecessary, entry of a password is not required. If secrecy is necessary, on the other hand, a decision is rendered to the effect that entry of a password is required. If the answer at step S11 is "NO", control proceeds to step S13. If the answer at step S11 is "YES", on the other hand, the keyboard 22 of the first computer 1 is operated to enter a password (step S12) and control proceeds to step S13.

When printer driver software [e.g., PostScript (trade mark of Adobe Systems Inc.) or LIPS (trade mark of Canon Inc.)] for generating PDL is started and printing is performed at step S13, information to the effect that a password is required is attached to the PDL data together with an ID code and the PDL data (print data) with the attached ID code is transmitted to he controller 5. Processing is then terminated.

Figure 8:
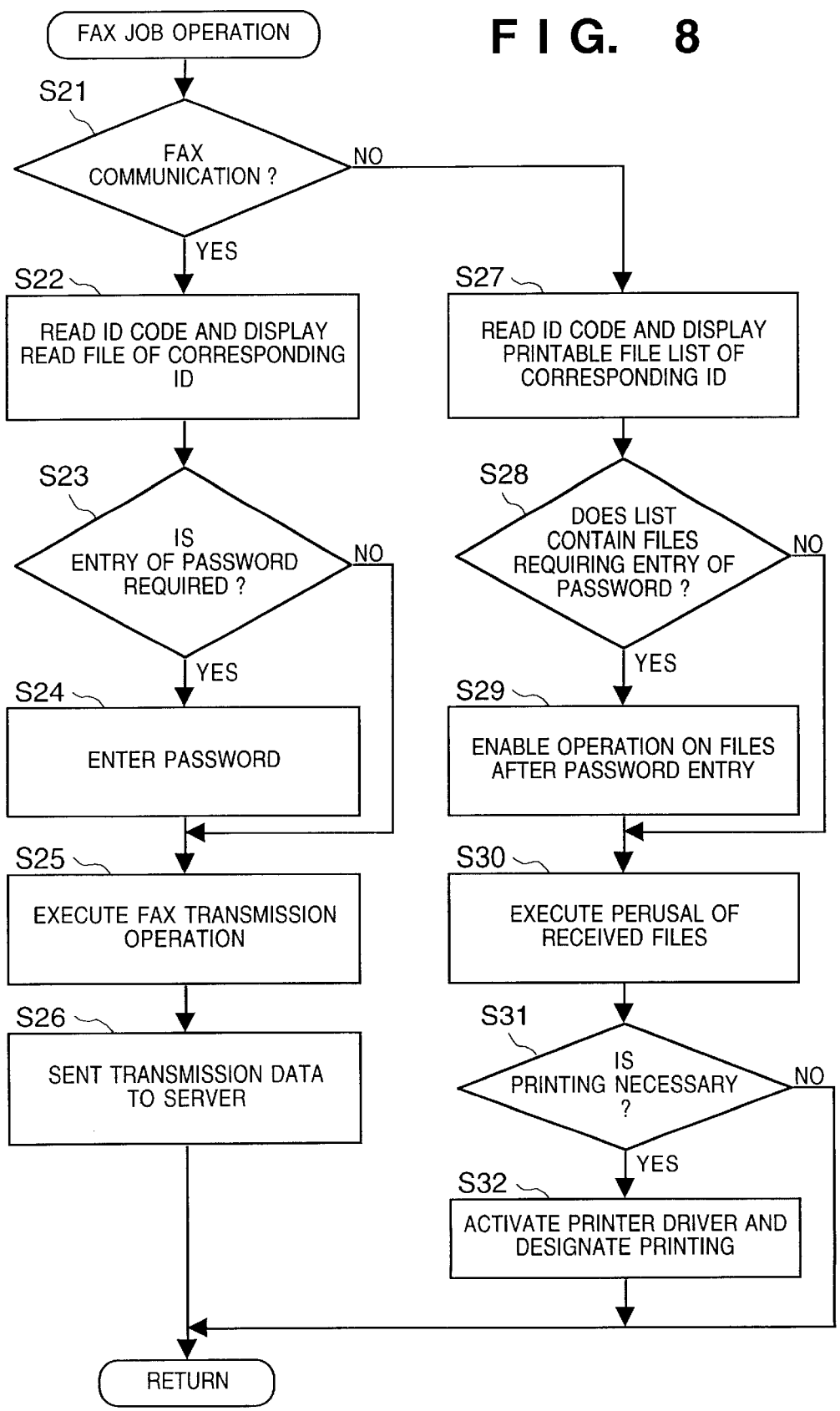
FIG. 8 is a flowchart of a fax job operation routine included in the main control procedure.

FIG. 8 is a flowchart of the fax job operation routine executed at step S4.

It is judged at step S21 whether a facsimile communication is performed and whether communication is transmission or reception. If the answer at step S21 is "YES", it is judged that facsimile data is to be transmitted. This is followed by step S22, at which the ID code stored on an ID card is read, the controller 5 is requested, via the network 6, for the file information for facsimile transmission and the file information is displayed on the display 23. Next, at step S23, it is determined whether entry of a password is required. If the answer is "NO", control proceeds to step S25. If the answer at step S23 is "YES", the keyboard 22 of first computer 1 is operated to enter the password (step S24) and control proceeds to step S25.

A plurality of files that have been stored in the controller 5 are subjected to processing at step S25 to change the addressee and the details of postscripts, etc. This is followed by step S26, at which the transmission data is processed in one batch and then sent to the first server 4. Processing is then terminated.

If the answer at step S21 is "NO", it is judged that facsimile data is to be received and then control proceeds to step S27. Here the ID code stored on the ID card is read, the first server 4 is requested, via the network 6, for printable files having the corresponding ID code and a list of the files is displayed on the display 23. Next, at step S28, it is determined whether the list contains received files requiring entry of a password. If the answer is "NO", control proceeds to step S30. If the answer is "YES" at step S28, then the keyboard 22 is operated at step S29 to enter a password, thereby making it possible for the files to be operated on.

This is followed by step S30, at which the received files are perused. More specifically, the content of the files displayed in the list is verified on the display 23 and any unnecessary files are deleted. Control then proceeds to step S31, at which it is determined whether the printing of received data is required. If the answer is "NO", processing is terminated. If the answer is "YES", on the other hand, the printer driver software is activated to convert the format of the data to one in which the data can be printed, the converted data is transmitted to the controller 5 and processing is then terminated.

Figure 9:
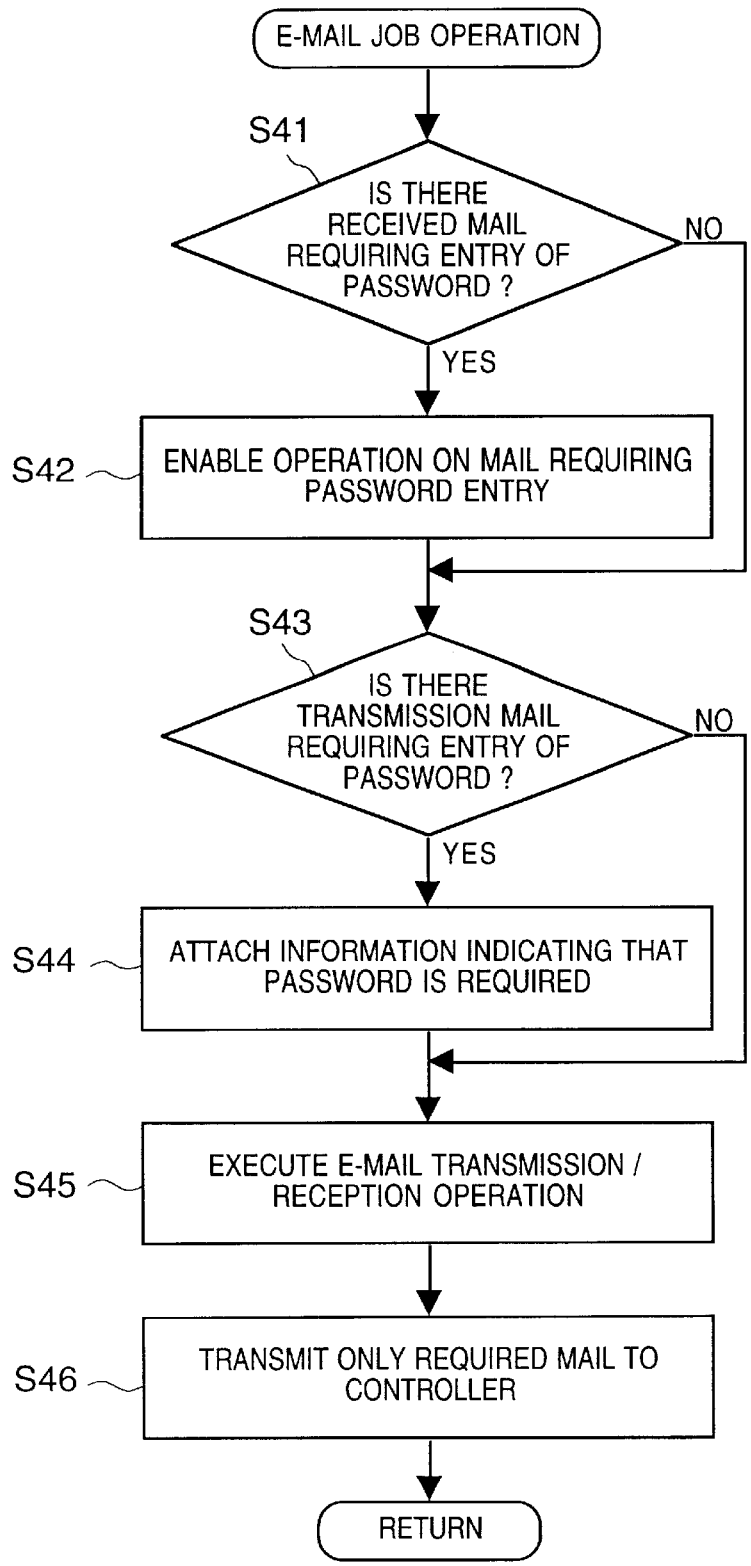
FIG. 9 is a flowchart of an electronic mail job operation routine included in the main control procedure.

FIG. 9 is a flowchart of the e-mail job operation routine executed at step S5.

It is determined at step S41 whether received mail requiring entry of a password exists. If the answer is "NO", control proceeds to step S43. If the answer is "YES", on the other hand, control proceeds to step S42, where the keyboard 22 is operated to enter a password and make possible an operation for receiving data requiring entry of a password.

Next, at step S43, it is determined whether transmission mail requiring entry of a password exists. If the answer is "NO", control proceeds to step S45. If the answer is "YES", on the other hand, control proceeds to step S44. Here the keyboard 22 is operated so that additional information to the effect that a password is required is attached to the transmission data. As a result, it is possible to recognize at the e-mail destination the fact that the e-mail requires entry of a password. It should be noted that this operation may be executed whenever e-mail for transmission is created or in one batch in regard to a plurality of items of mail for transmission.

Next, at step S45, e-mail transmission/reception processing is executed. This is followed by step S46, at which the required e-mail is selected from the processing items of e-mail, the printer driver software is activated to convert the e-mail data to printable format, the converted data is then transmitted to the controller 5 and processing is terminated.

As a result, it is possible to obtain a hard copy of desired e-mail using the printer 45 of digital copier 10.

Figure 10:
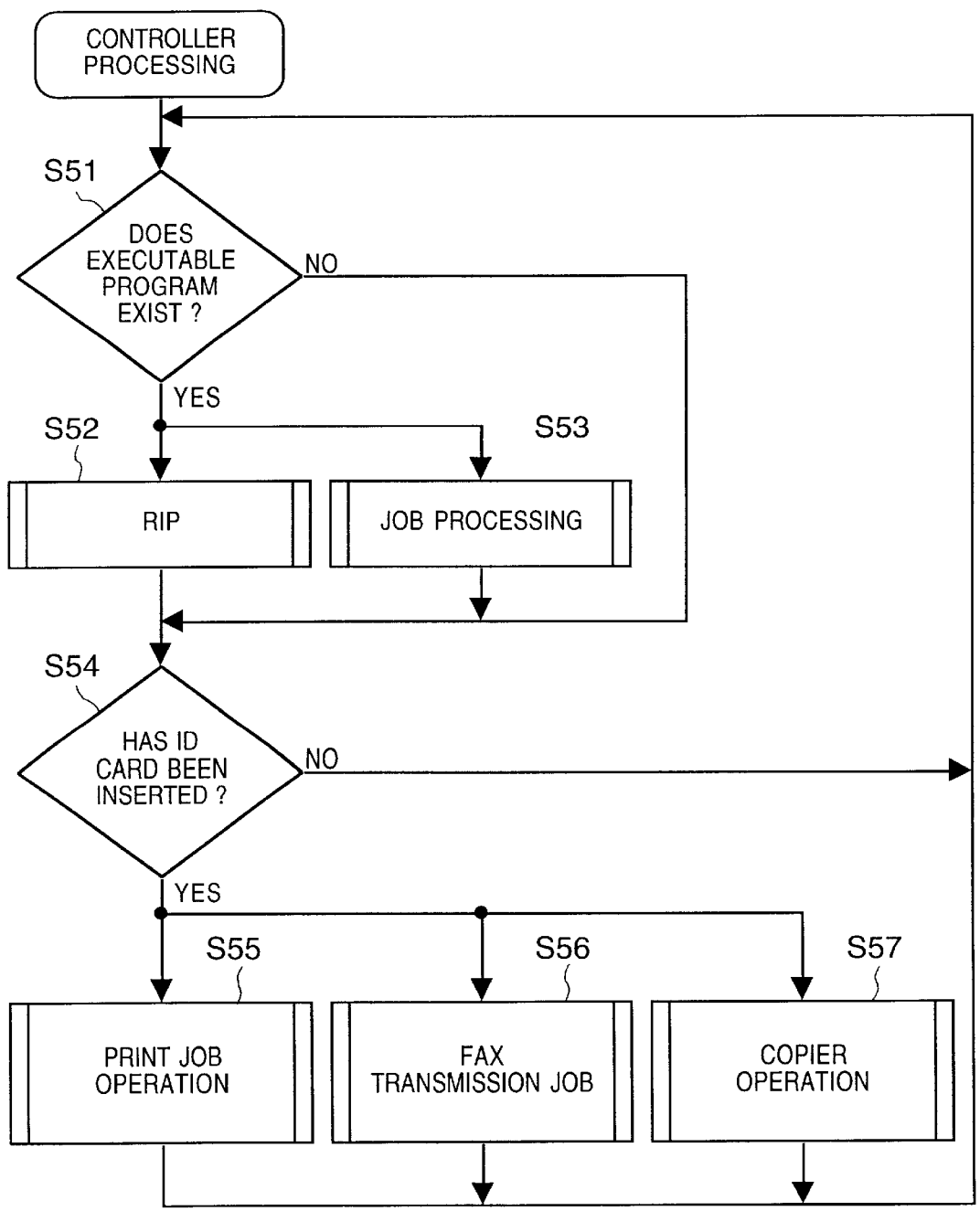
FIG. 10 is a flowchart showing a main control procedure executed by the controller in the information processing system of this embodiment.

FIG. 10 is a flowchart showing a control procedure executed by the controller 5. Specifically, the program is executed by the CPU 54 of the controller 5.

It is determined at step S51 whether an executable program exists when the apparatus is in the idle state. If the answer is "YES", control proceeds to step S52 or S53 as necessary. Processing by a RIP is executed at step S52 to develop PDL data that is the object of processing into raster image data. Job management processing is executed at step S53 so that a job whose data has already been developed into raster image data by an RIP but has been left as is for a long period of time without being printed out is processed automatically.

After the processing of step S52 or S53 has been executed, or when the decision rendered at step S51 is "NO", control proceeds to step S54, where it is determined whether the ID card has been inserted into the fourth ID card recognition unit 14.

If the ID card has been inserted into the fourth ID card recognition unit 14, the ID information stored on the ID card is recognized and the console 50 of controller 5 is then operated to decide the content of the job operation. That is, in case of printing processing, a print job operation is performed (step S55). Specifically, a print job for printing data that has been developed into raster image data by processing executed by an RIP, a print job for printing FAX reception data or a print job for printing data from the scanner 44 is executed. In case of facsimile transmission, FAX transmission job management is performed (step S56) so that processing for facsimile transmission of image data read by the scanner 44 via the first computer 1 is performed. In a case where image data that has been read by the scanner 44 is copied, the copier is operated (step S57) and a prescribed copying operation is carried out. Control returns to step S51 at the end of each processing operation.

Figure 11:
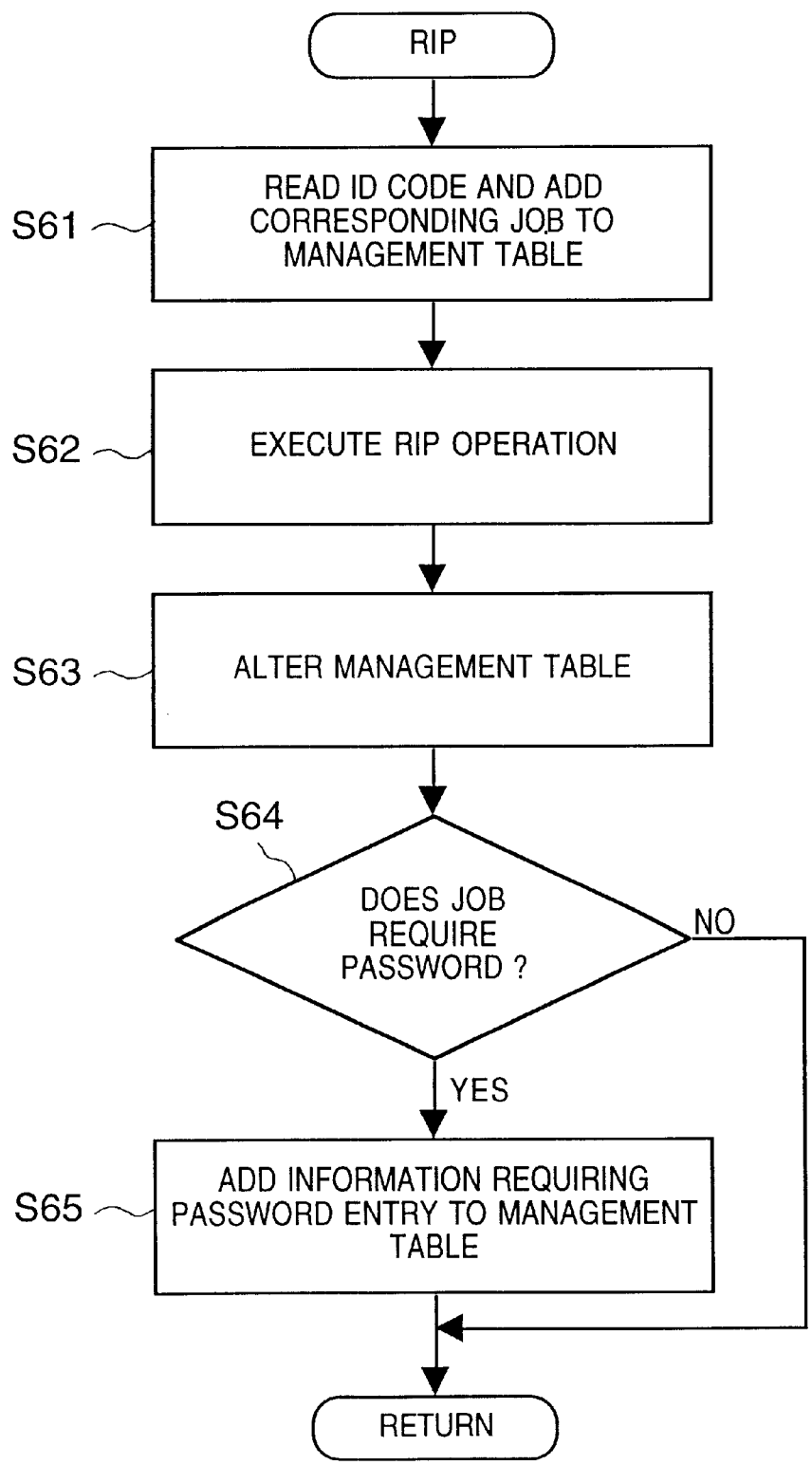
FIG. 11 is a flowchart of raster image processing included in the main control procedure.

FIG. 11 is a flowchart of the processing routine performed by the RIP at step S52.

The ID code is read from PDL or other data sent from the first computer 1 and the ID code is recorded as a job in a management table within the memory 52 at step S61. Next, at step S62, the operation by the RIP is started and the PDL data is developed into raster image data. At this time a status indicating that processing by the RIP is in progress is recorded in a management table. When operation by the RIP is subsequently completed, control proceeds to step S63, where the status recorded in the management table indicating that processing by the RIP is in progress is changed to status indicating that processing by the RIP is finished. This is followed by step S64, at which it is determined whether this is a job requiring entry of a password. If the answer is "NO", processing is terminated. If the answer is "YES", on the other hand, information indicating that entry of a password is required is recorded in the management table (step S65) and processing is terminated.

Figure 12:
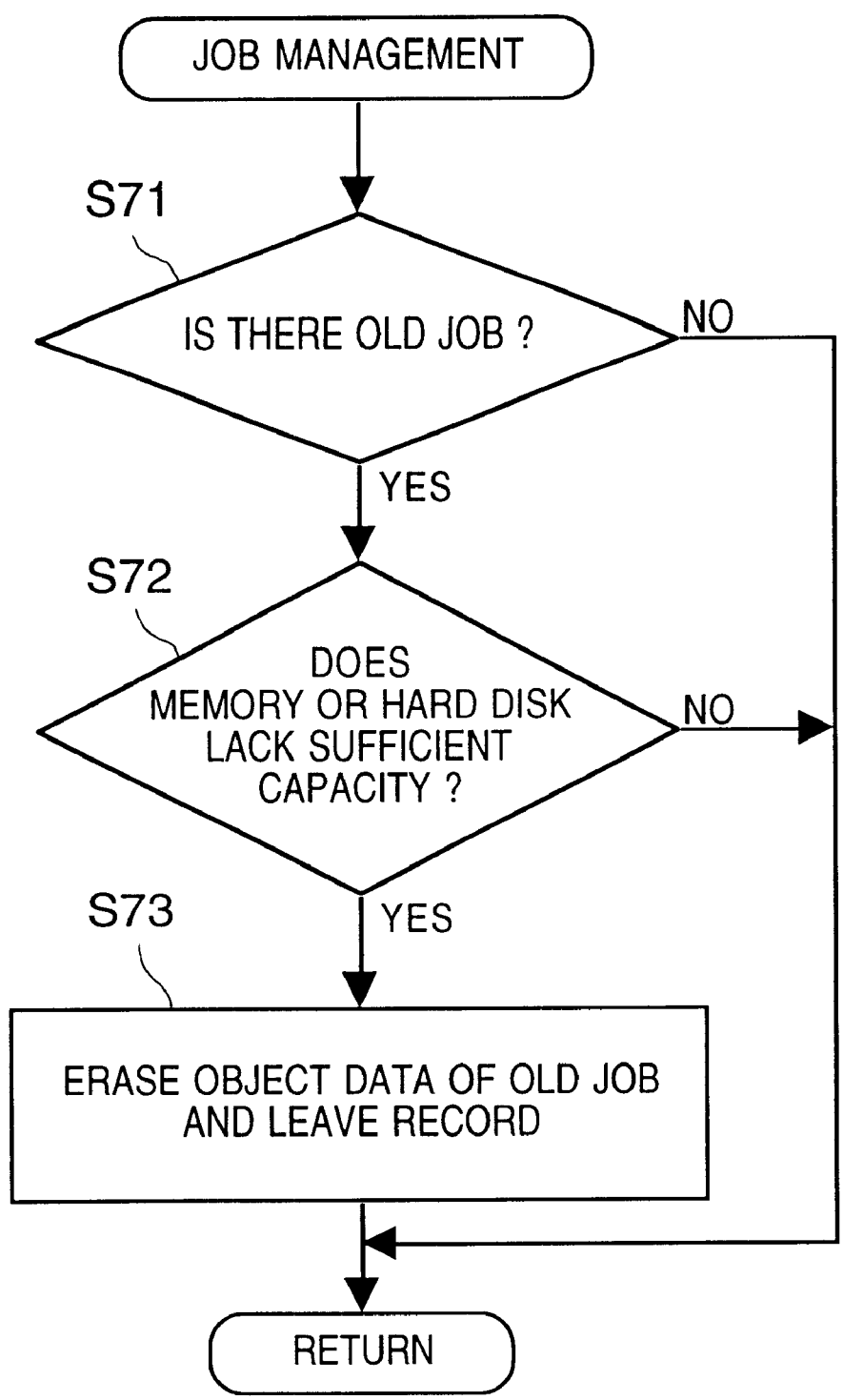
FIG. 12 is a flowchart of a job management routine included in the main control procedure.

FIG. 12 is a flowchart of the job management routine executed at step S53.

It is determined at step S71 whether an old job (a job left unexecuted for an extended period of time) exists. If the answer is "NO", processing is terminated. If the answer is "YES", on the other hand, it is determined whether there is enough storage capacity in the hard disk drive 51 or memory 52. Whether or not there is sufficient storage capacity is judged using as a criterion a predetermined value that will make it possible to assure enough storage capacity for the operation performed by RIP. For example, in a case where the storage capacity of the hard disk drive 51 is required to be at least 100 MB for the operation by the RIP, the criterion used in judgment is whether the available storage capacity is at least 100 MB. If the answer is "NO" at step S72, processing is terminated. If the answer is "YES" at step S72, on the other hand, the object data of the old job is erased and record of the fact that the data has been erased is left in the management table of memory 52 (step S73). Processing is then terminated. It should be noted that this record may be presented by providing a limit on the total number of jobs and erasing an old job when a fixed number of jobs is exceeded. By thus leaving a record of jobs, the user can easily ascertain the status of his or her own jobs. The result is improved operability.

Figure 13:
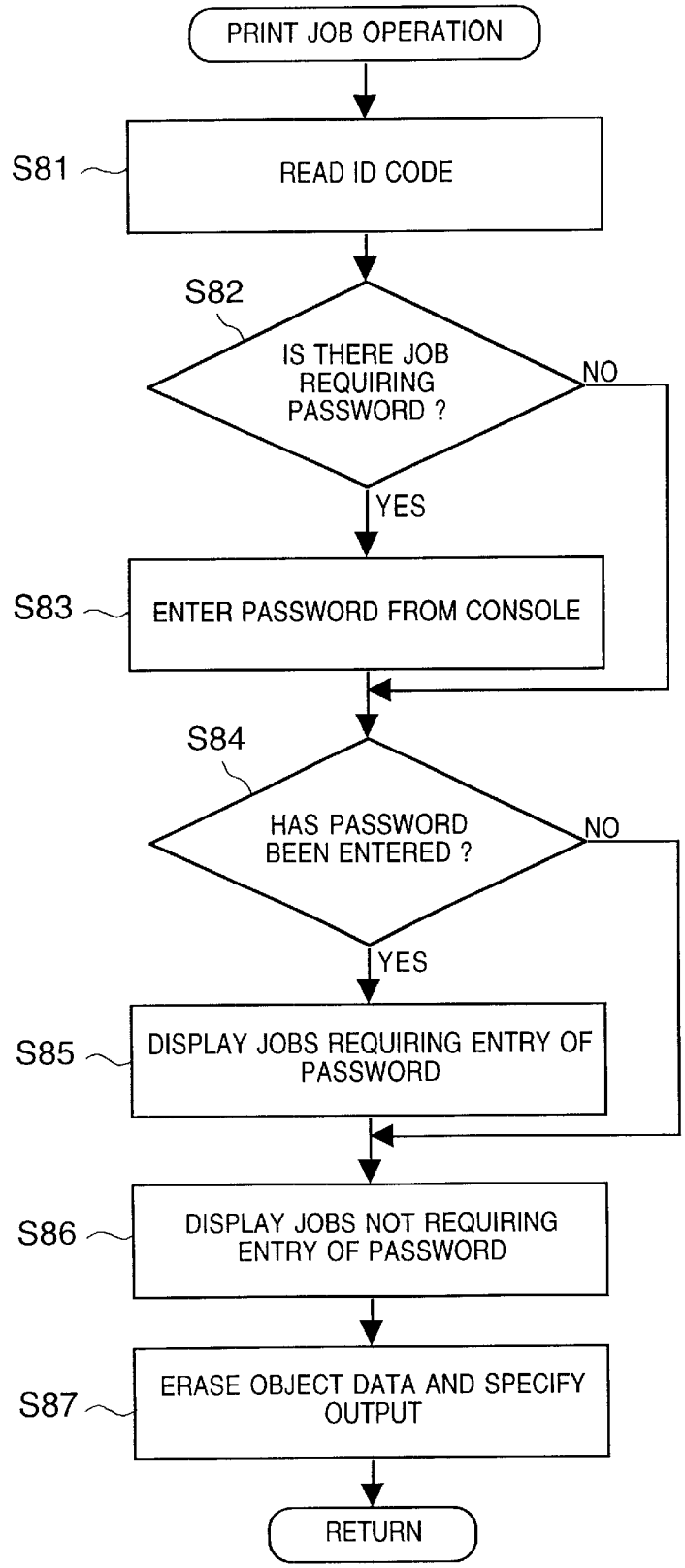
FIG. 13 is a flowchart of a print job operation routine included in the main control procedure.

FIG. 13 is a flowchart of the print job operation routine executed at step S54.

The ID code stored on the ID card is recognized and a job corresponding to this ID code is retrieved at step S81. This is followed by step S82, at which it is determined whether there is a job requiring entry of a password. If the answer is "NO", control proceeds to step S84. If the answer is "YES", on the other hand, control proceeds to step S83, where the console 50 is operated to enter a password. Next, it is determined at step S84 whether a password has been entered. If the answer is "NO", control proceeds to step S86. If the answer is "YES", on the other hand, jobs requiring entry of the password are displayed on the touch panel 56 of the console 50 at step S85. This is followed by step S86, at which jobs not requiring entry of a password are also displayed on the touch panel 56 of the console 50. The output and erasure of the object data is commanded (step S87) and processing is then terminated. In regard to jobs not requiring entry of a password, an arrangement may be adopted in which these jobs are displayed on the touch panel 56 when step S81 is executed.

Figure 14:
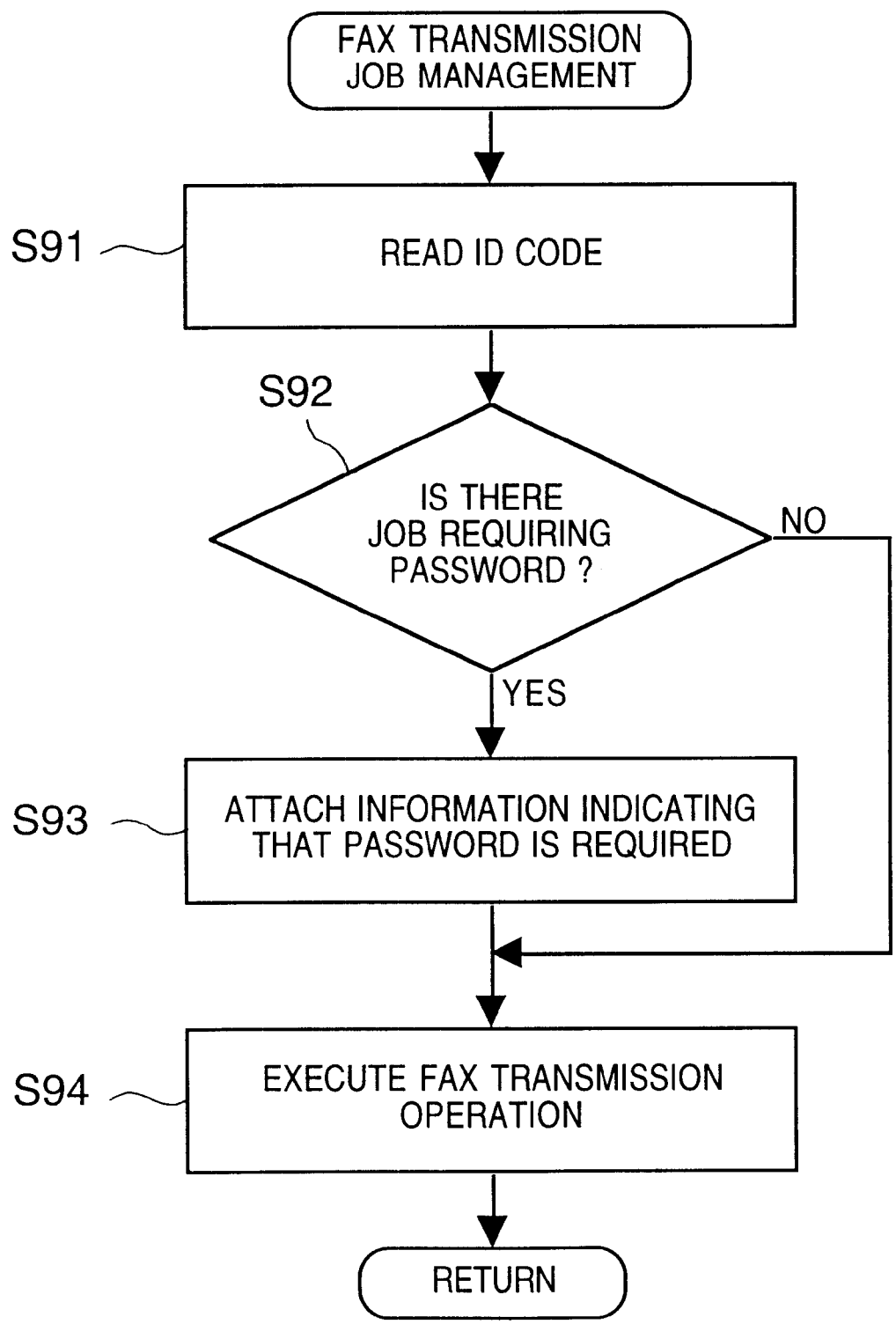
FIG. 14 is a flowchart of a fax transmission job operation routine included in the main control procedure.

FIG. 14 is a flowchart of the FAX transmission job management routine executed at step S56.

The ID code stored on the ID card is read at step S91. Next, at step S92, it is judged for every item of entered transmission data whether entry of a password is required. If the answer is "NO", control proceeds to step S94. If the answer is "YES", on the other hand, information indicating that a password is required is added onto the transmission data (step S93) and a FAX transmission operation is executed (step S94), after which processing is terminated. As a result, even after the transmitted document is scanned by the scanner 44, the image data is stored on the hard disk drive 51 and the job is retained until the first computer 1 executes FAX transmission processing (step S26 in FIG. 8). In a case where transmission is urgent, information for the sake of transmission may be added on the image data by operating the console 50 and may be transmitted to the first server 4 directly.

Figure 15:
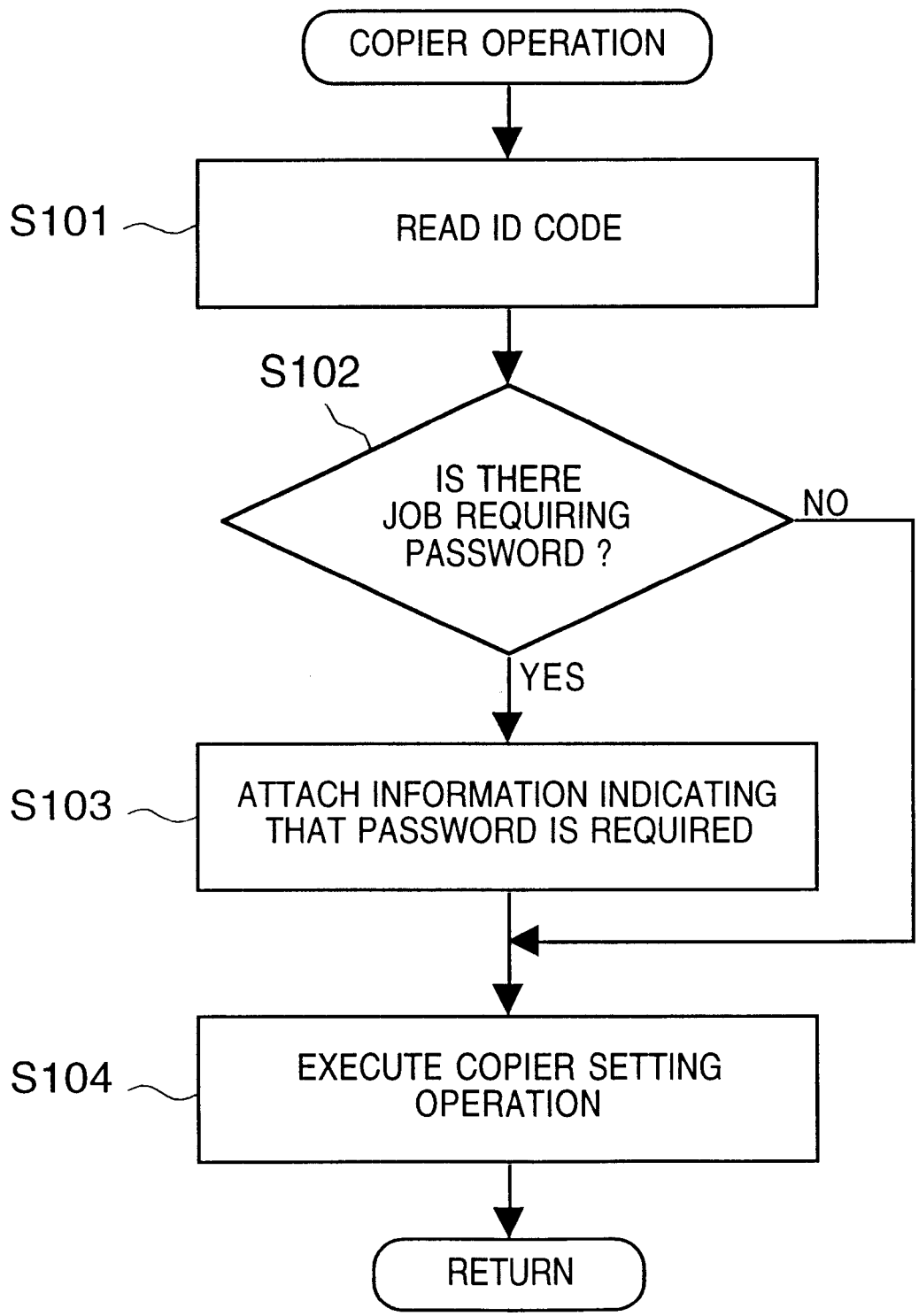
FIG. 15 is a flowchart of a copier operation routine included in the main control procedure.

FIG. 15 is a flowchart of the copier operation routine executed at step S57.

The ID code stored on the ID card is read at step S101. Next, at step S102, it is judged whether the job is one requiring entry of a password. If the answer is "NO", control proceeds to step S104. If the answer is "YES", on the other hand, information indicating that a password is required is added onto the job (step S103) and control proceeds to step S104. Here an operation for setting copying is executed and then processing is terminated. As a result, even after the transmitted document is scanned by the scanner 44, the image data is stored on the hard disk drive 51. It should be noted that the copying job stored on the hard disk drive 51 can be output along with another job at step S87 of the print job operation routine.

Figure 16:
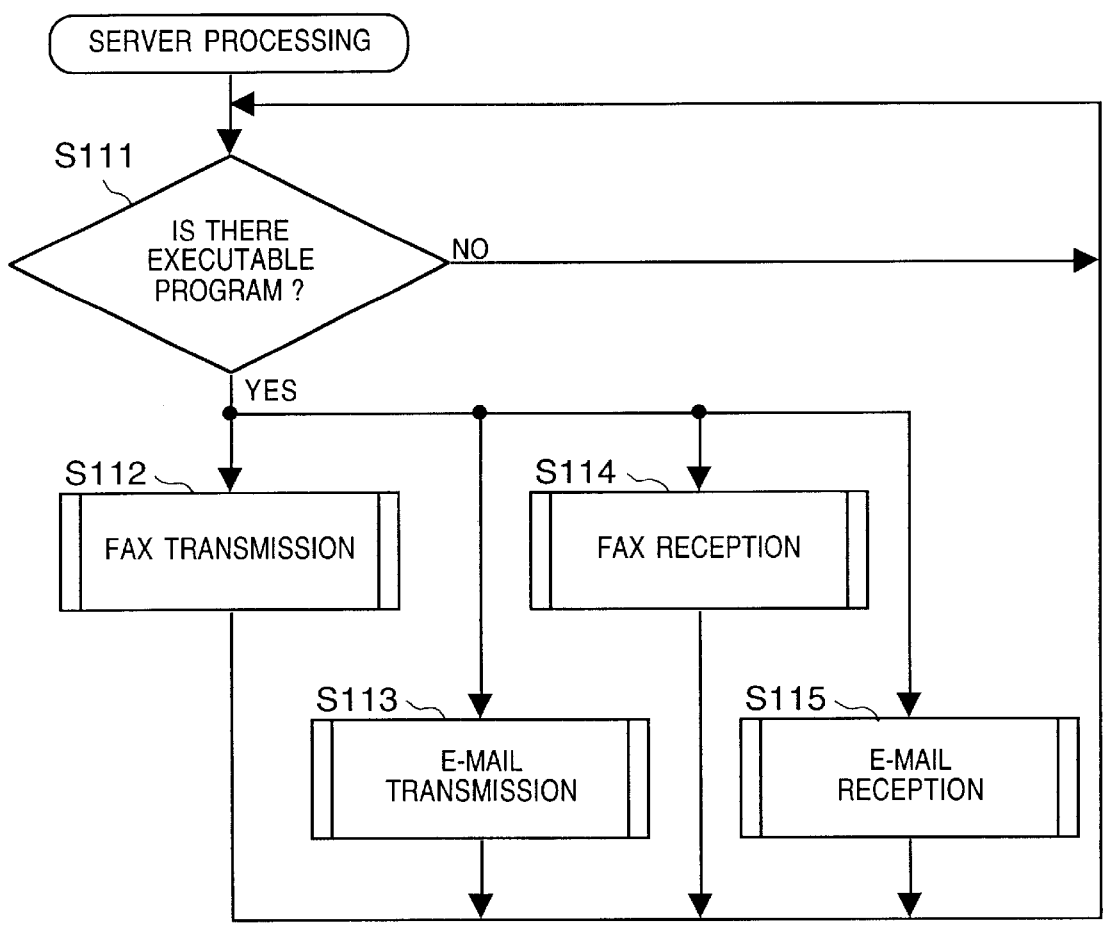
FIG. 16 is a flowchart showing a main control procedure executed by a first server.

FIG. 16 is a flowchart of a control procedure executed by the first server 4. The procedure is executed by the CPU 34 based upon a program that has been installed in the hard disk drive 31 of first server 4.

It is determined at step S111 whether there is an executable program among programs for FAX transmission, FAX reception, e-mail transmission and e-mail reception. If the answer is "YES", the keyboard 29 of the first server 4 is operated to decide the job content. If facsimile data is to be transmitted, FAX transmission is executed (step S112). If data transmission by e-mail is to be performed, e-mail transmission is executed (step S113). If facsimile data is to be received, FAX reception is executed (step S114). If data reception by e-mail is to be performed, e-mail reception is executed (step S115). Control returns to step S111 after each of these processing operations is completed.

Figure 17:
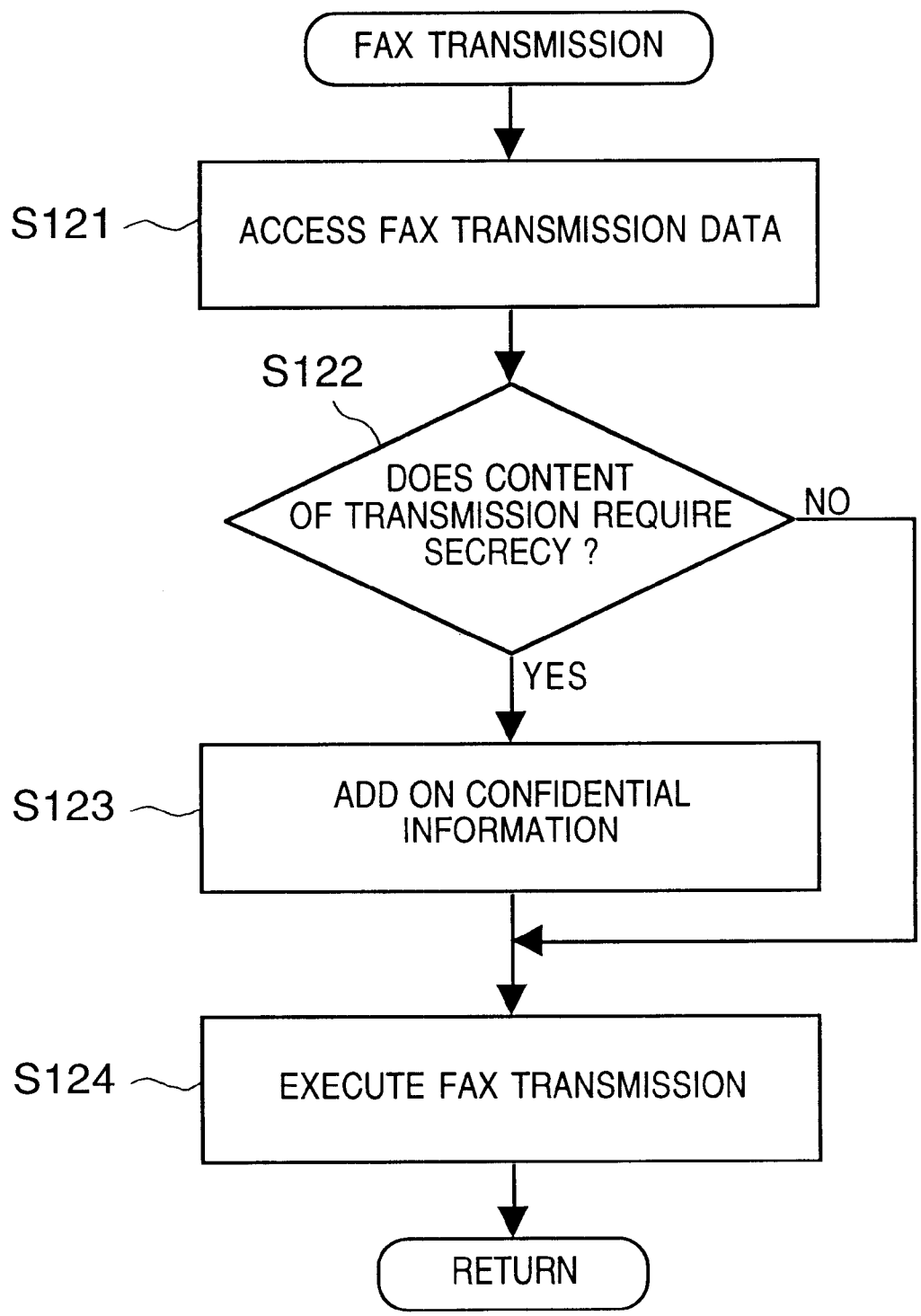
FIG. 17 is a flowchart of a fax transmission routine included in the main control procedure.

FIG. 17 is a flowchart of the FAX transmission processing routine executed at step S112.

Individual items of FAX transmission data that have been sent to the first server 4 are accessed at step S121. This is followed by step S122, at which it is determined, based upon whether a password has been entered or not, whether the transmission data is data requiring secrecy. If the answer is "NO", control proceeds to step S124. If the answer is "YES", on the other hand, confidential information is added on (step S123) and control proceeds to step S124. Here facsimile transmission to the communication line 7 is executed, after which processing is terminated.

Figure 18:
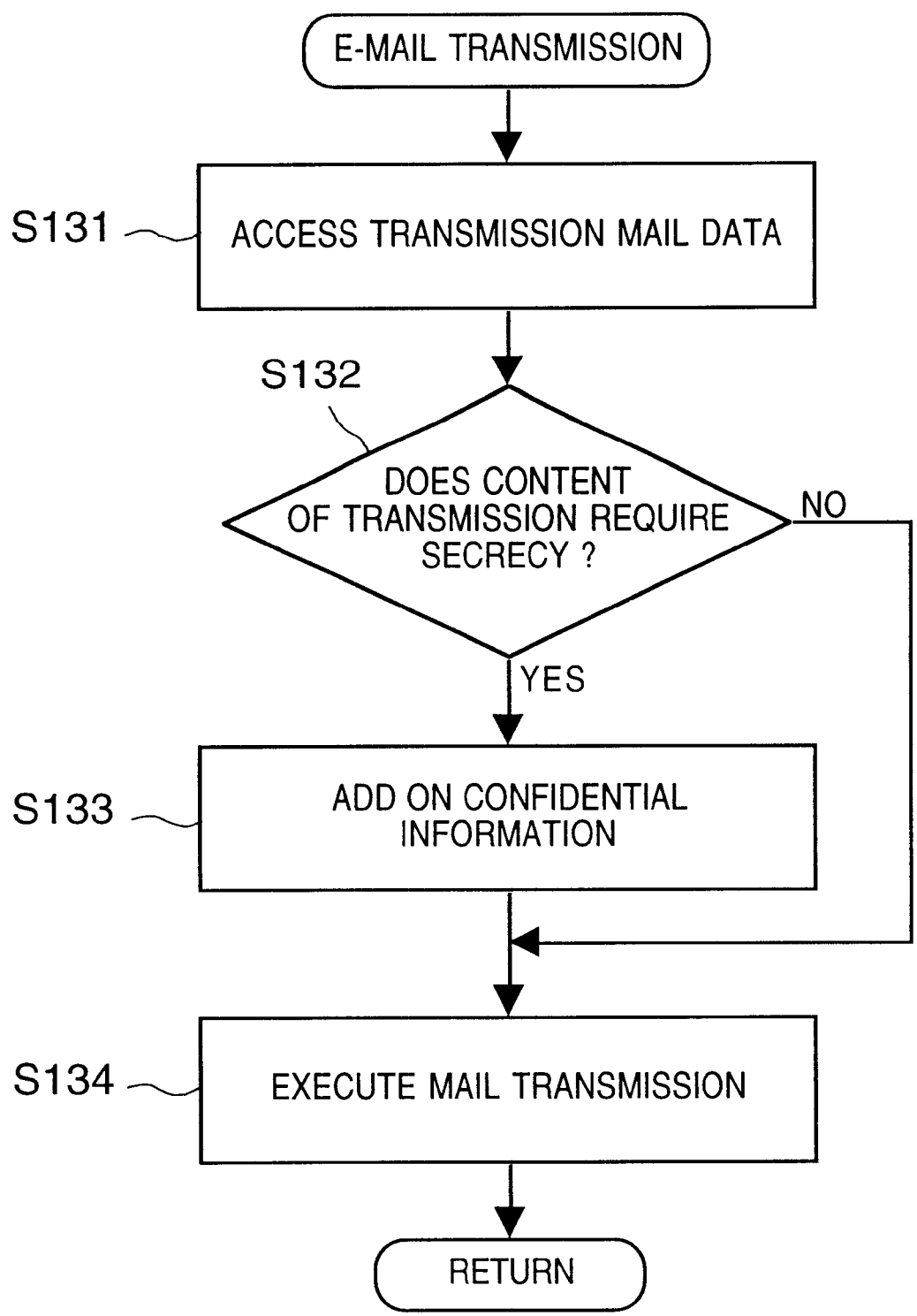
FIG. 18 is a flowchart of an electronic mail transmission routine included in the main control procedure.

FIG. 18 is a flowchart of the e-mail transmission processing routine executed at step S113.

Transmission mail data that has been sent to the first server 4 is accessed at step S131. This is followed by step S132, at which it is determined, based upon whether a password has been entered or not, whether the transmission data is data requiring secrecy. If the answer is "NO", control proceeds to step S134. If the answer is "YES", on the other hand, confidential information is added on (step S133) and control proceeds to step S134. Here transmission of the mail is executed, after which processing is terminated.

Figure 19:
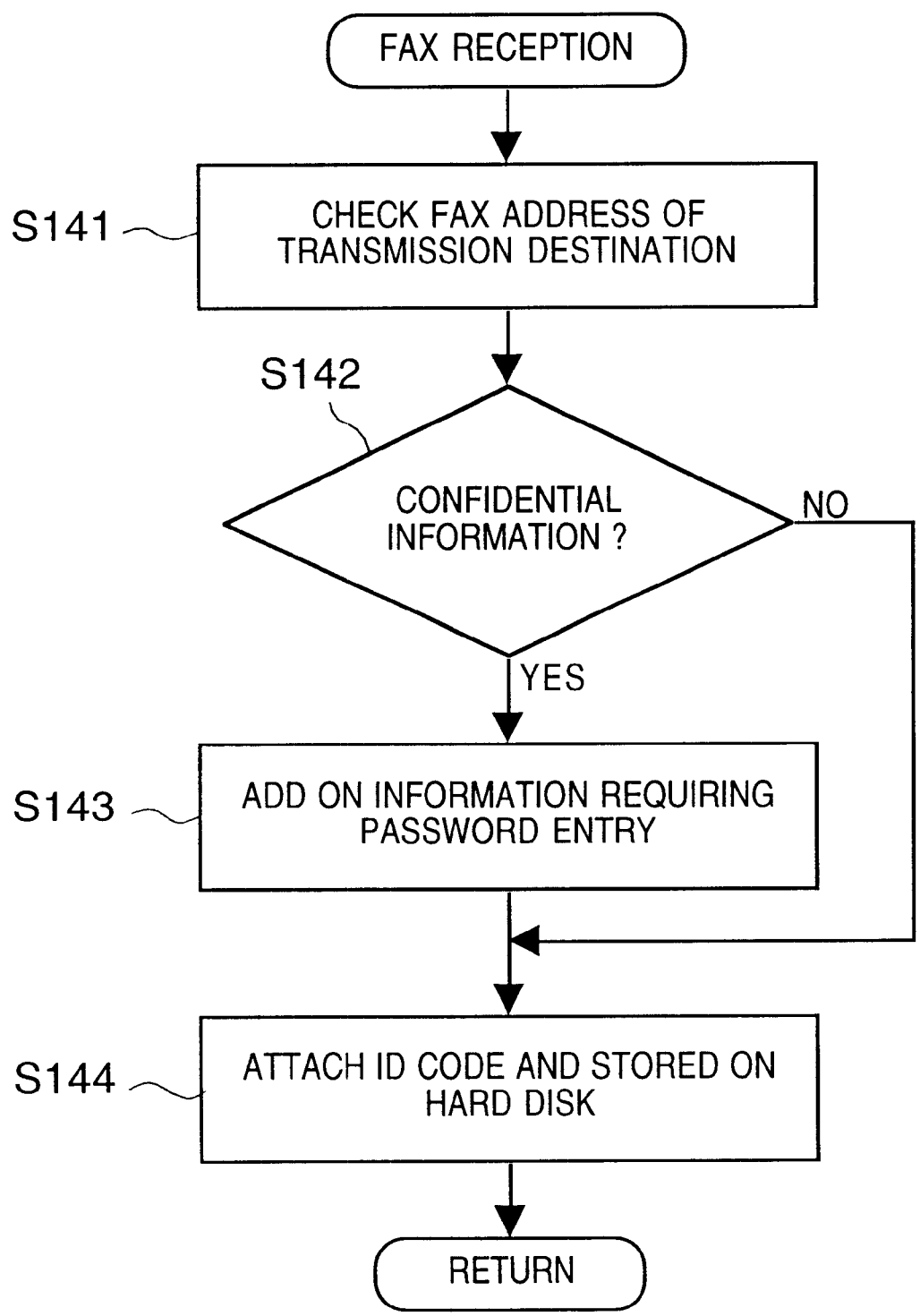
FIG. 19 is a flowchart of a fax reception routine included in the main control procedure.

FIG. 19 is a flowchart of the FAX reception processing routine executed at step S114.

The FAX address (see FIG. 5) stored on an ID card is checked at step S141, after which it is determined whether the received data is confidential information (step S142). If the answer is "NO", control proceeds to step S144. If the answer is "YES", on the other hand, information indicating that entry of a password is required is added on the received data (step S143) and control proceeds to step S144. As a result, the user is prompted to enter a password when received data is accessed from the first computer 1. This is followed by step S144, at which an ID code is attached to the received data and the received data is stored on the hard disk drive 31. Processing is then terminated.

Figure 20:
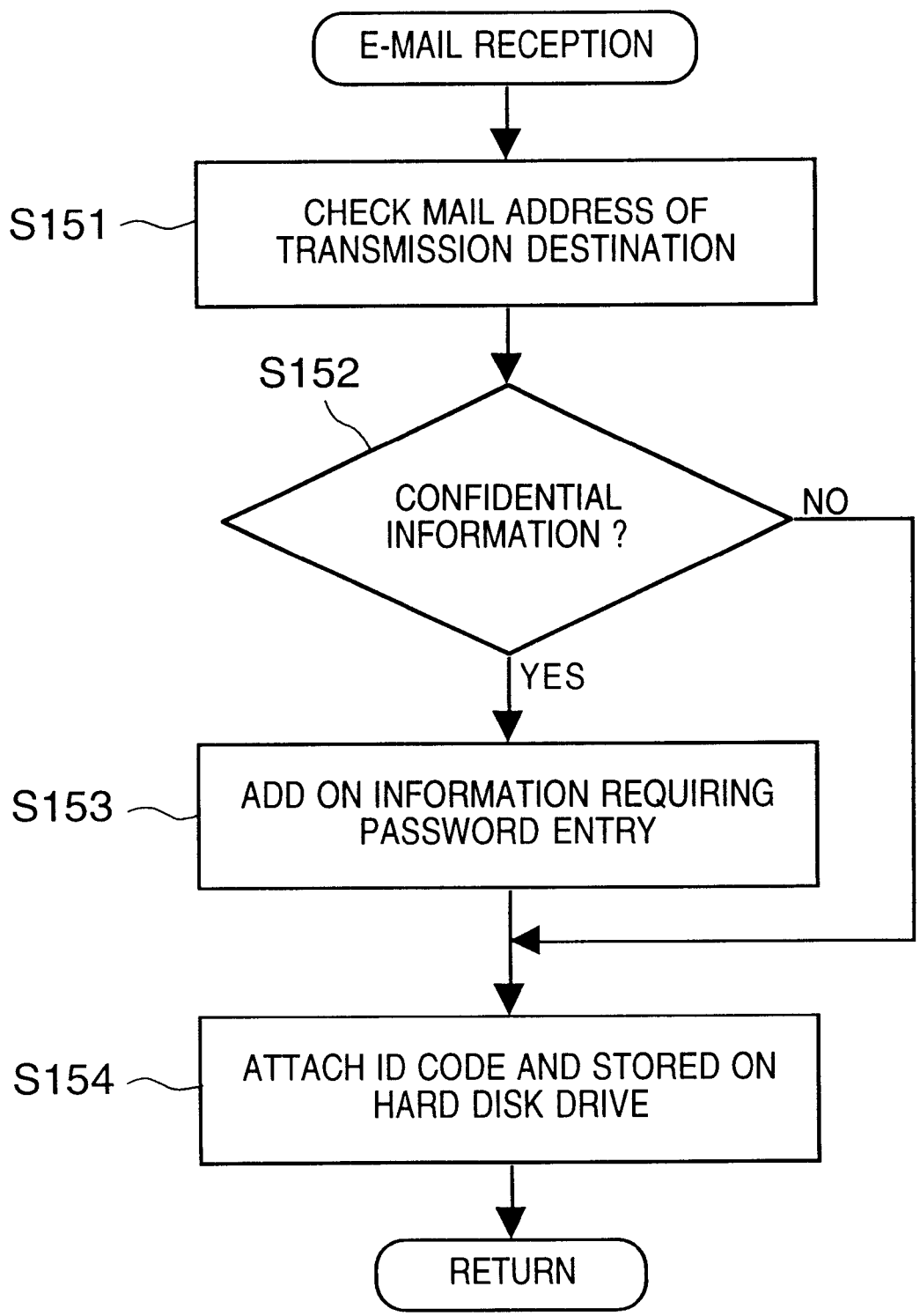
FIG. 20 is a flowchart of an electronic mail reception routine included in the main control procedure.

FIG. 20 is a flowchart of the e-mail reception routine executed at step S115.

The mail address (see FIG. 5) stored on an ID card is checked at step S151, after which it is determined whether the mail data is confidential information (step S152). If the answer is "NO", control proceeds to step S154. If the answer is "YES", on the other hand, information indicating that entry of a password is required is added on the mail data (step S153) and control proceeds to step S154. As a result, the user is prompted to enter a password when received data is accessed from the first computer 1. This is followed by step S154, at which an ID code is attached to the mail data and the mail data is stored on the hard disk drive 31. Processing is then terminated.

Thus, according to this embodiment, the ID information of a user is recognized via the first through third ID card recognition units 11–13 of the first through third computers 1–3, then a match with the user is verified by ID information recognized by the fourth ID card recognition unit 14 attached to the controller 5. After verification is made, the digital copier 10 outputs the object data of the job. As a result, even if the user remotely issues a command for implementation of his or her own job, the digital copier 10 will not output the job unless the user goes to the location of the controller 5 and operates the controller. In other words, the digital copier 10 provides its output when the user is present. As a result, printing paper will not overflow from the drop tray of the digital copier 10 and the efficiency of the operation is improved.

Figure 21:
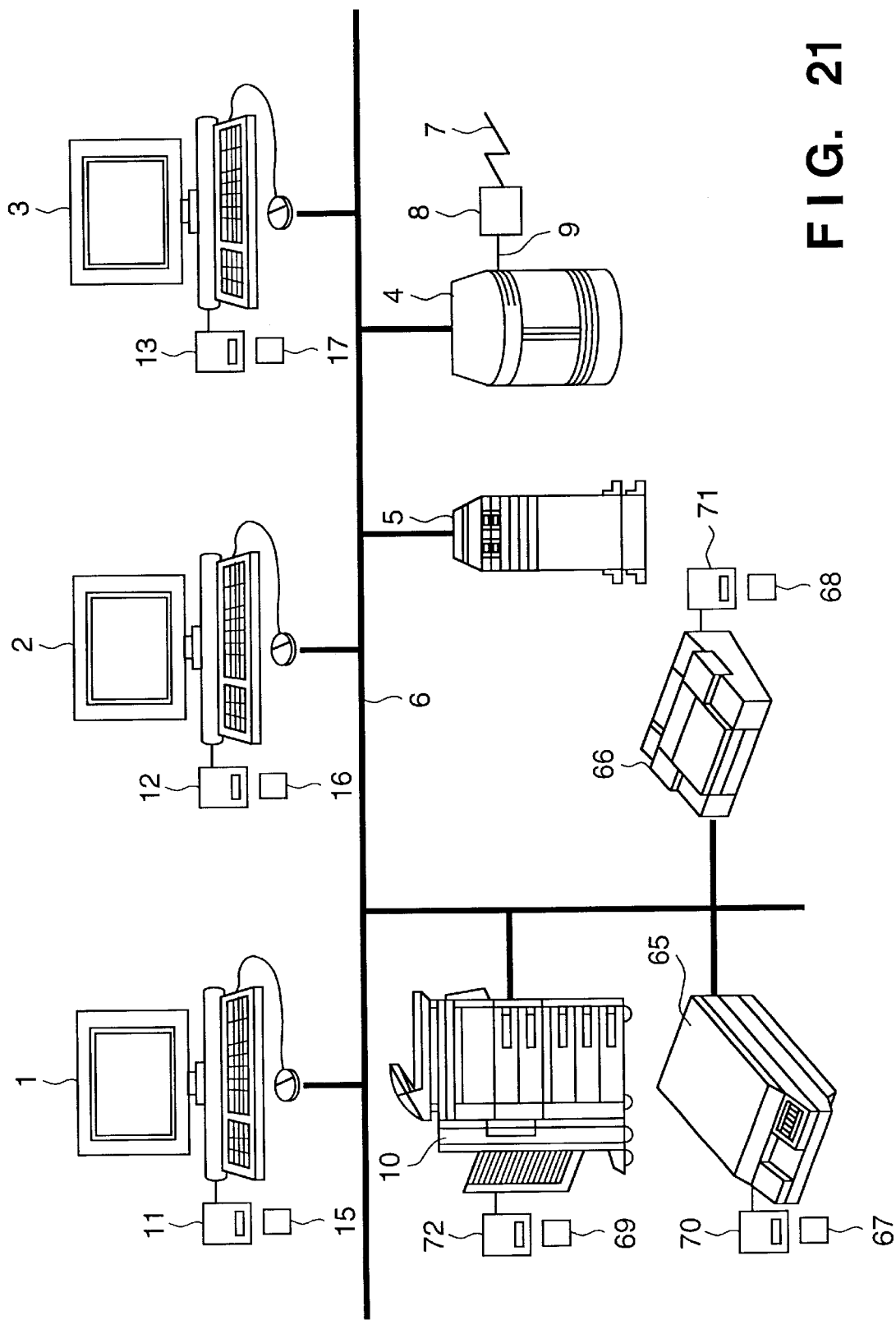
FIG. 21 is a diagram showing the configuration of an information processing system according to another embodiment of the present invention.

FIG. 21 is a diagram showing the configuration of an information processing system according to another embodiment of the present invention. Here a scanner 65 and a printer 66 are connected to the network 6. Fifth through seventh ID card recognition units 70–72 into which ID cards 67–69 are removably inserted are connected to the scanner 65, printer 66 and digital copier 10, respectively.

This embodiment is such that when, say, the digital copier 10 is used, the ID card 69 is inserted into the fourth ID card recognition unit 71, whereby the digital copier 10 recognizes the user ID code or the like and a the controller 5 determines whether a job corresponding to this ID code exists. In a manner similar to that of the foregoing embodiment, the sending and receiving of compressed digital images is carried out between the digital copier 10 and controller 5. The same is true with regard to the scanner 65 and printer 66. That is, communication is performed between the scanner 65 or printer 66 and the controller 5 and compressed digital images are sent and received.

Thus, in this embodiment, a plurality of image input/output units (digital copier 10, scanner 65, printer 66) are arranged on the network 6 and these image input/output units are controlled by the single controller 5. The result is even greater convenience for the user. For example, if the user wishes to obtain a printout, it is possible for the user to receive an output of his or her own job from either the digital copier 10 or printer 66. In addition, if one output unit is being used, the other output unit can be used. Furthermore, by utilizing the output unit installed closest to the user, the system can be used even more conveniently.

The present invention is not limited to the foregoing embodiments. In the embodiments described above, the object data of each job is stored in the hard disk drive 51 of the controller 5 and the processing of each job is executed by operating the console 50 of the controller 5. However, an arrangement may be adopted in which the object data of each job is stored in the hard disk drive 24 of the first computer 1, for example, and the processing of each job is executed by operating the keyboard 22 of the first computer 1. Further, by thus making it possible to perform remote control of the first through third computers 1–3, a specific user will no longer occupy the controller 5. This makes the system even more convenient to use.

If there is in increase in the number of users, the number of computers or the number of input/output devices such as the digital copier 10 in the embodiments described above, the load on the controller 5 increases and the time needed for processing by the RIP lengthens or the transfer of images takes place more frequently, the result being a decline in efficiency. These difficulties can be eliminated by providing the network with a plurality of the controllers 5. For example, assume that there are 20 users. By providing two of the controllers 5 and allotting the jobs of ten users to each controller, the jobs processed by the controllers 5 are distributed between them to alleviate a decline in efficiency that would otherwise accompany an increased controller load. If there are a large number of users, providing a plurality of controllers in dependence upon the types of jobs, such as image scanning or printing jobs, also makes it possible to deal with a decline in efficiency that would otherwise accompany an increased controller load.

In accordance with the embodiments described above, different information source protocols for copiers, scanners, printers, facsimile communication and e-mail or sent and received data can be managed unitarily on a per-user basis. This makes it possible to prevent the mixing of one's own jobs with the jobs of other users and to realize ideal system operation.

Furthermore, since one can output the object data relating to one's own job by going to the output unit, it is possible to prevent unnecessary printing operations from being carried out.

Further, data that has been stored on a hard disk drive can be output at will from an output unit regardless of the type of job.

Further, a list of data that has been stored on a hard disk drive can be displayed and any desired item of data in the list can be operated on. As a result, it is possible to selectively process desired data and to improve operability.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is applicable also to a case where the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. A multifunctional apparatus comprising:

input means for inputting image data having one of predetermined IDs from a plurality of information sources, each of the plurality of information sources generates an image data using a protocol different from each other;

storage means for storing the image data input by said input means;

first designating means for designating a desired ID from said predetermined IDs for specifying image data corresponding to the desired ID;

display means for displaying a list of image data, from among the image data that has been stored in said storage means, of which the predetermined ID corresponds to the desired ID designated by said first designating means;

selecting means for selecting desired image data from the list of image data; and processing means for processing the desired image data selected by said selecting means.

2. The apparatus according to claim 1, wherein said input means inputs the image data from reading means for reading an image on a document, from a computer for outputting print data, from a communication line for receiving facsimile data, or from e-mail transmitting means.

3. The apparatus according to claim 1, wherein said display means displays the list of image data together with information indicating the information source of each item of image data input by said input means.

4. The apparatus according to claim 1, wherein said designating means designates a user ID.

5. The apparatus according to claim 1, further comprising second designating means for designating a password;
wherein in a case where desired image data selected by said selecting means has been stored in said storage means in correspondence with the password, said processing means processing the image data in dependence upon designation of a correct password by said second designating means.

6. The apparatus according to claim 1, wherein said processing means visually outputs an image based upon the image data.

7. The apparatus according to claim 1, wherein said display means displays the list of image data together with information indicating the status of each item of image data input by said input means.

8. A data processing method comprising:
an input step, of inputting image data having one of predetermined IDs from a plurality of information sources, each of the plurality of information sources generates an image data using a protocol different from each other;
a storage step, of storing the image data input in said input step;
a designating step, of designating a desired ID from said predetermined IDs for specifying image data corresponding to the desired ID;
a display step, of displaying a list of image data, from among the image data that has been stored at said storage step, of which the predetermined ID corresponds to the desired ID designated in said designating step;
a selecting step, of selecting desired image data from the list of image data; and
a processing step, of processing the desired image data selected in said selecting step.

9. A computer readable program stored in a storage medium comprising:
an input step, of inputting image data having one of predetermined IDs from a plurality of information sources, each of the plurality of information sources generates an image data using a protocol different from each other;
a storage step, of storing the image data input in said input step;
a designating step, of designating a desired ID from said predetermined IDs for specifying image data corresponding to the desired ID;
a display step, of displaying a list of image data, from among the image data that has been stored in said storage step, of which the predetermined ID corresponds to the ID designated in said designating step;
a selecting step, of selecting desired image data from the list of image data; and
a processing step, of processing the desired image data selected in said selecting step.

10. A multifunctional apparatus comprising:
input means for inputting data having one of predetermined conditions, the data input by said input means is based on one of a plurality of protocols;
storage means for storing the data input by said input means based on its own predetermined condition;
designating means for designating one of the predetermined conditions for specifying data corresponding to said designated one of said predetermined conditions;
display means for extracting a plurality of data, from among the data stored in said storing means, in accordance with the predetermined condition designated by said designating means and for displaying a list of the extracted data;
selecting means for selecting one of the data from the list of data displayed by said displaying means; and
processing means for processing the data selected by said selecting means.

11. The apparatus according to claim 10, wherein said input mean inputs the data by an E-mail.

12. The apparatus according to claim 10, wherein said input means inputs the data by a facsimile communication.

13. The apparatus according to claim 10, wherein said input means inputs the data from an image reader.

14. The apparatus according to claim 10, further comprising:
recognition means for recognizing an ID card which stores information for specifying a user; and
wherein said designating means designates the condition based on the information stored in said ID card recognized by said recognition means.

15. The apparatus according to claim 10, wherein aid processing means prints an image based on the data selected by said selecting means.

16. The apparatus according to claim 10, wherein said processing means displays an image based on the data selected by said selecting means.

17. The apparatus according to claim 10, wherein said processing means deletes the data selected by said selecting means.

18. A data processing method comprising the steps of:
an input step, of inputting data having one of predetermined conditions, the data input by said input means is based on one of a plurality of protocols;
a storage step, of storing the data input in said input step based on its own predetermined condition;
a designating step, of designating one of the predetermined conditions for specifying a plurality of data corresponding to said designated one of said predetermined conditions;
a display step, of extracting said plurality of data from among the data stored in said storing step, in accordance with the one of the predetermined conditions designated in said designating step and for displaying a list of the extracted data;
a selecting step, of selecting one of the data from the list of data displayed in said displaying step; and
a processing step, of processing the data selected in said selecting step.

19. A computer readable program stored in a storage medium comprising the steps of:
an input step, of inputting data having one of predetermined conditions, the data input by said input means is based on a plurality of protocols;

a storage step, of storing the data input in said input step based on its own predetermined condition;

a designating step, of designating one of the predetermined conditions for specifying a plurality of data corresponding to said designated one of said predetermined conditions;

a display step, of extracting said plurality of data, from among the data stored in said storing step, in accordance with one of the predetermined conditions designated in said designating step and for displaying a list of the extracted data;

a selecting step, of selecting one of the data from the list of data displayed in said displaying step; and a processing step, of processing the data selected in said selecting step.

* * * * *

UNITED STATES PATENT AND TRADEMARK OFFICE
CERTIFICATE OF CORRECTION

PATENT NO.   : 6,438,574 B1
DATED        : August 20, 2002
INVENTOR(S)  : Nao Nagashima It is certified that error appears in the above-identified patent and that said Letters Patent is hereby corrected as shown below:

Column 2,
Line 28, "does" should read -- does not --; and
Line 49, "Yet" should read -- Yet another --.

Column 4,
Line 64, "execute" should read -- executes --.

Column 5,
Line 30, "are" should read -- which are --; and
Line 42, "comprise" should read -- comprising --.

Column 8,
Line 18, "to" should read -- or --; and
Line 34, "he" should read -- the --.

Column 13,
Line 33, "in increase" should read -- an increase --.

Column 15,
Line 16, "processing" should read -- processes --.

Column 16,
Lines 3, 44 and 66, "is" should read -- being --;
Line 33, "aid" should read -- said --;

Signed and Sealed this

Sixth Day of May, 2003

JAMES E. ROGAN
*Director of the United States Patent and Trademark Office*